(12) United States Patent
Kumaresan et al.

(10) Patent No.: US 11,960,523 B2
(45) Date of Patent: Apr. 16, 2024

(54) MULTI-DIMENSIONAL CLUSTERING AND CORRELATION WITH INTERACTIVE USER INTERFACE DESIGN

(71) Applicant: Oracle International Corporation, Redwood Shores, CA (US)

(72) Inventors: Dhileeban Kumaresan, Foster City, CA (US); Jae Young Yoon, San Mateo, CA (US); Adrienne Wong, Redwood City, CA (US); Chandra Sekhar Komali, Mountain House, CA (US); Sreeji Krishnan Das, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/184,187

(22) Filed: Mar. 15, 2023

(65) Prior Publication Data
US 2023/0214416 A1 Jul. 6, 2023

Related U.S. Application Data

(63) Continuation of application No. 17/330,154, filed on May 25, 2021, now Pat. No. 11,669,559.
(Continued)

(51) Int. Cl.
*G06F 16/00* (2019.01)
*G06F 11/32* (2006.01)
(Continued)

(52) U.S. Cl.
CPC ............ *G06F 16/355* (2019.01); *G06F 11/32* (2013.01); *G06F 11/3476* (2013.01);
(Continued)

(58) Field of Classification Search
CPC .... G06F 16/355; G06F 16/217; G06F 16/285; G06F 16/287
(Continued)

(56) References Cited

U.S. PATENT DOCUMENTS

| 10,203,847 B1 | 2/2019 | Haitani et al. |
| 2006/0129447 A1 | 6/2006 | Dockery et al. |

(Continued)

OTHER PUBLICATIONS

Dai, Hetong, et al. "Logram: Efficient Log Parsing Using n-Gram Dictionaries." arXiv preprint arXiv:2001.03038 (Jan. 7, 2020). pp. 1-13 (Year: 2020).

(Continued)

*Primary Examiner* — Alexandria Y Bromell
(74) *Attorney, Agent, or Firm* — Invoke

(57) ABSTRACT

Techniques for implementing user interfaces, systems, and processes for multidimensional clustering and analysis are described herein. In one aspect, an application or cloud service receives a request to cluster a set of records where the request identifies a first set of one or more dimensions to use for clustering and a second set of one or more dimensions to analyze for correlation patterns. Responsive to receiving the request to cluster the set of records, the system generates clusters based at least in part on variances in the first set of one or more dimensions, wherein each cluster includes at least one record from the set of records. The system may generate, for each respective cluster, an analytic result that identifies how strongly the second set of one or more dimensions correlate to the respective cluster. The system may present the clusters and analytic results for further processing.

20 Claims, 19 Drawing Sheets

Related U.S. Application Data

(60) Provisional application No. 63/119,500, filed on Nov. 30, 2020.

(51) Int. Cl.
    *G06F 11/34*     (2006.01)
    *G06F 16/21*     (2019.01)
    *G06F 16/2455*   (2019.01)
    *G06F 16/2457*   (2019.01)
    *G06F 16/28*     (2019.01)
    *G06F 16/35*     (2019.01)
    *G06F 40/242*    (2020.01)
    *G06F 40/284*    (2020.01)

(52) U.S. Cl.
    CPC ........ *G06F 16/217* (2019.01); *G06F 16/2455* (2019.01); *G06F 16/24575* (2019.01); *G06F 16/285* (2019.01); *G06F 16/287* (2019.01); *G06F 40/242* (2020.01); *G06F 40/284* (2020.01); *G06F 2201/80* (2013.01)

(58) Field of Classification Search
    USPC .......................................................... 707/803
    See application file for complete search history.

(56) References Cited

U.S. PATENT DOCUMENTS

| | | | |
|---|---|---|---|
| 2009/0100339 | A1 | 4/2009 | Wharton-Ali et al. |
| 2015/0066814 | A1 | 3/2015 | Allen et al. |
| 2016/0255236 | A1 | 9/2016 | Roche et al. |
| 2017/0060837 | A1 | 3/2017 | Dusberger et al. |
| 2017/0169080 | A1 | 6/2017 | Parthasarathy et al. |
| 2017/0251003 | A1 | 8/2017 | Rostami-Hesarsorkh et al. |
| 2017/0277582 | A1* | 9/2017 | Chen ................. H04L 43/045 707/707 |
| 2018/0060211 | A1 | 3/2018 | Allen et al. |
| 2018/0203915 | A1* | 7/2018 | Marshall ................. G06F 16/00 707/707 |
| 2018/0227190 | A1* | 8/2018 | Healing ................. G06F 16/285 707/707 |
| 2019/0065343 | A1 | 2/2019 | Li et al. |
| 2019/0336767 | A1 | 11/2019 | Klepfer et al. |
| 2020/0311414 | A1 | 10/2020 | Enuka et al. |
| 2020/0349225 | A1 | 11/2020 | Agrahari et al. |
| 2021/0089377 | A1 | 3/2021 | Wang et al. |
| 2021/0117232 | A1 | 4/2021 | Sriharsha et al. |
| 2021/0133622 | A1 | 5/2021 | Nidd et al. |
| 2021/0142124 | A1 | 5/2021 | Ollikainen |
| 2021/0397639 | A1* | 12/2021 | Jacob ................. G06F 40/284 707/707 |

OTHER PUBLICATIONS

Du, Min, et al. "Deeplog: Anomaly detection and diagnosis from system logs through deep learning." Proceedings of the 2017 Acm Sigsac conference on computer and communications security. 2017, pp. 1285-1298 (Year: 2017).

Dwaraki, Abhishek, et al. "Automated event identification from system logs using natural language processing." 2020 International Conference on Computing, Networking and Communications (ICNC). (Mar. 30, 2020), pp. 209-215 (Year: 2020).

Huang, Shaohan, et al. "Paddy: An event log parsing approach using dynamic dictionary." NOMS 2020-2020 IEEE/IFIP Network Operations and Management Symposium. IEEE, (Jun. 8, 2020), pp. 1-8 (Year: 2020).

Liu, Kui, et al. "Mining fix patterns for findbugs violations." IEEE Transactions on Software Engineering 47.1 (2018): pp. 165-188 (Year: 2018).

Nagappan, Meiyappan, et al. "Abstracting log lines to log event types for mining software system logs." 2010 7th IEEE Working Conference on Mining Software Repositories (MSR 2010). IEEE, 2010, pp. 114-117 (Year: 2010).

Shima, Keiichi. "Length matters: Clustering system log messages using length of words." arXiv preprint arXiv:1611.03213 (2016), pp. 1-10 (Year: 2016).

Tang, Liang, Tao Li, et al. "LogSig: Generating system events from raw textual logs." Proceedings of the 20th ACM international conference on Information and knowledge management. 2011, pp. 785-794 (Year: 2011).

* cited by examiner

| Custom: | emcsadmin ▽ |
|---|---|
| Dec 30, 2016 04:00:00 000 PM - Dec 31, 201... ▽ | |

65.9K Flight Records

ⓘ 12 Flights — 308

| Start Time | End Time |
|---|---|
| Dec 31, 2015, 4:00:00 PM | Dec 29, 2016, 4:00:00 PM |
| Dec 31, 2015, 4:00:00 PM | Dec 30, 2016, 4:00:00 PM |
| Dec 31, 2015, 4:00:00 PM | Dec 30, 2016, 4:00:00 PM |
| Dec 31, 2015, 4:00:00 PM | Dec 30, 2016, 4:00:00 PM |
| Jan 3, 2016, 4:00:00 PM | Dec 25, 2016, 4:00:00 PM |
| Jan 4, 2016, 4:00:00 PM | Dec 19, 2016, 4:00:00 PM |
| Dec 31, 2015, 4:00:00 PM | Dec 28, 2016, 4:00:00 PM |
| Dec 31, 2015, 4:00:00 PM | Dec 30, 2016, 4:00:00 PM |
| Jan 1, 2016, 4:00:00 PM | Dec 30, 2016, 4:00:00 PM |

ORACLE MANAGEMENT CLOUD | Log Analytics — 310

*Start typing entity name(s)...*

Log Explorer:SD: Airline Flights - Event Correlation

'Upload Name' = emcsadmin.srdas_airline_delay_2016_all and 'Cancelled ?' = '1.00' | rename 'Compartment Name' as|Name| link Na — 312

☐ Fields

*Search Fields*

△ Pinned
A Annotation Identifier
A Entity
A Entity Type
A Label
A Log Entity
A Log Source
A Problem Priority
A Severity
A Upload Name | *Clear*
△ Other
A Actual Arrival (HHMM)
A Actual Departure (HH..
A Actual Elapsed Time (..
A Air Time (minutes)
A Airline
A Airline ID ☐ Visualize Link ▷

Link By

| Name | ✕ |
| Origin City | ✕ |
| Destination City | ✕ |

Display Fields

*Drop field here*

Display Options

☐ Show Problem Logs Only
☐ Show Log Scale on Histogram

6,023 Flights

No log records have been analyzed for anomalies.

🎲 Analyze ▷  ⚙ Options ▷  🔍 Show ▷  ⓘ

| Name | Origin City |
|---|---|
| american airlines inc. | new york, ny |
| american airlines inc. | washington, dc |
| southwest airlines co. | los angeles, ca |
| southwest airlines co. | san francisco, ca |
| american airlines inc. | boston, ma |
| american airlines inc. | new york, ny |

MULTI-DIMENSIONAL CLUSTERING AND CORRELATION WITH INTERACTIVE USER INTERFACE DESIGN

INCORPORATION BY REFERENCE; DISCLAIMER

The following applications are hereby incorporated by reference: application Ser. No. 17/330,154 filed on May 25, 2021; application No. 63/119,500 filed on Nov. 30, 2020. The applicant hereby rescinds any disclaimer of claims scope in the parent application(s) or the prosecution history thereof and advise the USPTO that the claims in the application may be broader that any claim in the parent application(s).

The following applications are hereby incorporated by reference as if set forth in their entirety: application Ser. No. 16/185,588, filed Nov. 9, 2018; Application Ser. No. 14/863,994 filed on Sep. 24, 2015; and application 62/056,073 filed on Sep. 26, 2014.

TECHNICAL FIELD

The present disclosure relates to techniques for processing log files. In particular, the present disclosure relates to clustering log files using natural language processing to provide analytic insights into the behavior of computing resources and to trigger downstream automated actions.

BACKGROUND

Many types of computing systems and applications generate vast amounts of data pertaining to or resulting from the operation of that computing system or application. These vast amounts of data are stored into collected locations, such as log records, which may be subsequently accessed by applications to review the contents contained therein. For example, an application may open a log file that contains various performance metrics for a hardware or software resource.

Server administrators and application administrators may benefit by analyzing the contents of system log records to diagnose system or application behavior. However, mining knowledge from log files can be a very challenging task for many reasons. One challenge is that the size of the log data may be very large, making it inefficient and difficult to analyze the large number of records for the specific items of interest. This may be particularly the case if the interesting entries in the log data are relatively sparse within the larger set of data, which is often the situation since severe problems are usually rare. Moreover, interesting insights may be hidden in sequences of events. The raw evidence to discover these insights may exist in the log files but combining the individual pieces of information together from among the vast set of log data to draw a meaningful conclusion can be a particularly non-trivial task.

The aforementioned problems become even more pronounced in large and complex ecosystems, such as complex enterprise-class database management systems and cloud environments. Such systems may produce very large volumes of data stored in hardware logs, operating system logs, application logs, application server logs, database server logs, and any other type of log that monitors the behavior of a large production system. Furthermore, a similar situation will also exist in a cloud environment, where multiple customers are sharing the same physical resources in a virtualized fashion. Mining knowledge from such log files may be comparable to looking for a needle in a haystack.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
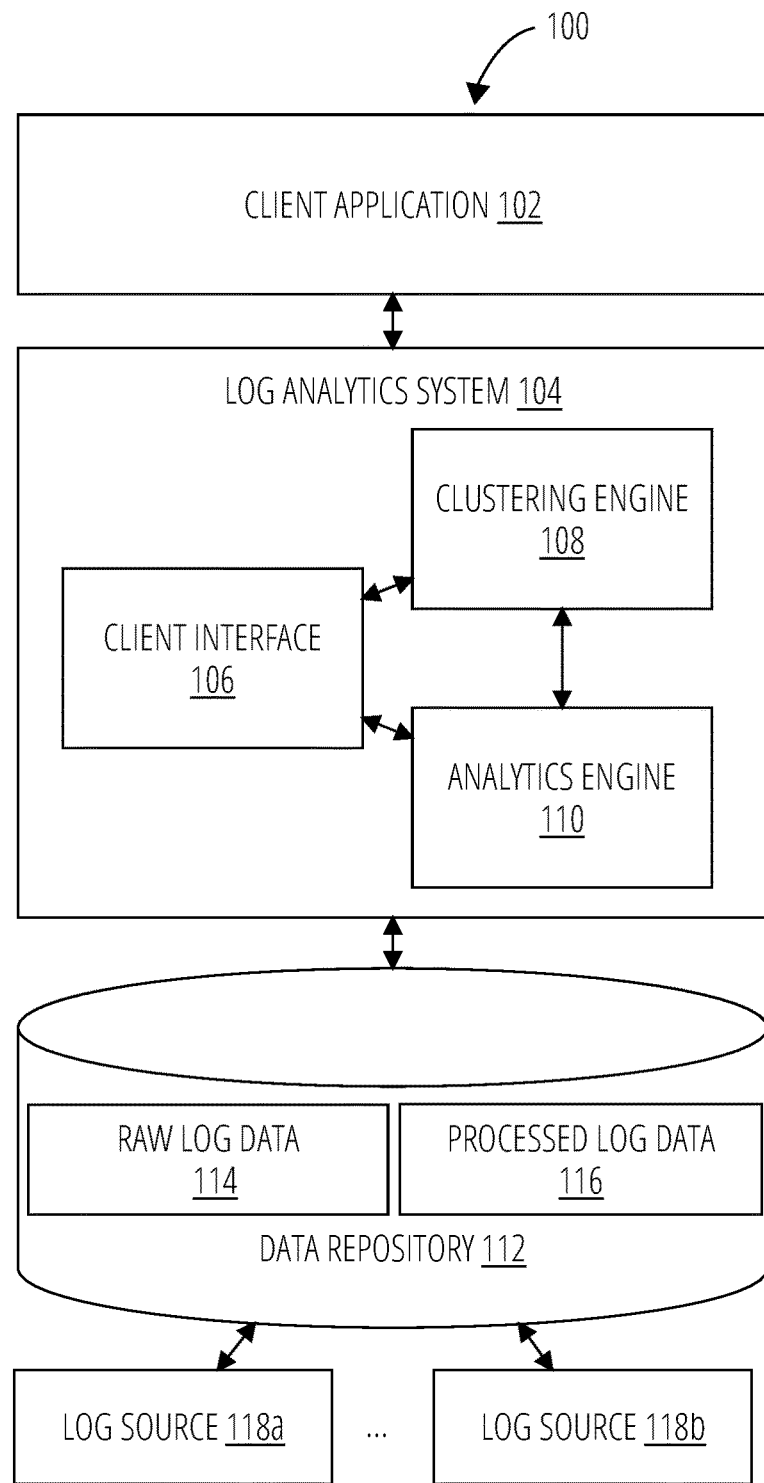
FIG. 1 illustrates an example system for analyzing and classifying sets of data according to an embodiment.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW

As noted above, many types of computing systems and applications generate vast amounts of data pertaining to or resulting from operation of the computing system or application. The data may be stored in collected locations, such as log records (also referred to herein as log files), which may be reviewed at a later time period to analyze the behavior or operation of the system or application. Embodiments herein provide techniques for efficiently analyzing and performing analytics on large datasets including log records collected over a period of time.

In an embodiment, a log analytics system clusters on fields, including formula fields, that are built from automatically parsed and aggregated log records. A field may represent a different attribute or dimension within a clustering space. A field may include a string value, numeric value, formula, and/or other attribute value. The log analytics system may use natural language processing (NLP) and/or machine learning to aggregate log records and build the field data. The log analytics system may further perform clustering across multiple dimensions, allowing various analytic functions to be executed on various combinations of fields and attributes.

In an embodiment, a clustering process includes multiple clustering phases, including a first phase for generating an initial cluster set of log records and a second phase for clustering the initial set of clusters. The multi-phase clustering approach may provide analytic insights that were not readily apparent from the raw log data or the initial cluster set, including identifying anomalous clusters of records grouped by various combinations of dimensions. The unique combination of dimensional attribute values for an outlier cluster may provide guidance on the root cause of performance issues in one or more systems that were the source of the log records.

In an embodiment, one or more phases of the clustering process account for display attributes when clustering log records. For example, the clustering process may factor in screen resolution when generating the clusters, limiting the maximum number of clusters to avoid excessive clutter on a graphical user interface (GUI) tasked with presenting cluster visualizations to a user. Additionally or alternatively, the clustering process may accept, as input, graphical dimensions such as an x-dimension, a y-dimension, a color dimension, and/or one or more other fields on which to perform clustering. The clustering process may generate clusters in a manner that allows for an intuitive display. For example, if a graphical dimension is a numeric value, then the clustering process may compute ranges to display on a graphical chart to avoid clutter and highlight outliers.

In an embodiment, the clustering process receives a correlation input from a user that specifies fields or use cases upfront pre-clustering. The correlation dimensions may be fed into a clustering engine to analyze how strongly the specified fields or use cases correlate to the generated clusters. Additionally or alternatively, the clustering engine may automatically identify the fields that are most strongly correlated with each cluster. The clustering engine may output an analytic result that identifies the correlation patterns, if any, in the specified and/or automatically detected fields or use cases.

In an embodiment, log analytics system may recommend and/or execute functions based on the clusters and/or associated analytic result. For example, the analytic result may be mapped to one or more recommended actions to perform to remediate a performance issue associated with an outlier cluster. Log analytics system may present the recommended action to a user via a GUI, which the user may then select to initiate execution.

In an embodiment, the system provides a multilayered interactive interface that allows users to drill down into specific clusters to view aggregate information for the cluster. The aggregate information may include unique values for one or more correlation inputs, the range of values represented by the cluster, the value of a cluster centroid, and/or the number of log records represented by the cluster. The multilayered interface may further allow a user to drill down to view individual log records and/or log record metadata. Additionally or alternatively, the multilayered interface may allow a user to trigger automated downstream actions, such as remedies for outliers among the clusters.

In an embodiment, the multilayered interface aggregates data from different domains. When a chart is initially generated and presented to a user, it may show clustered data from the same domain or source. When a user interacts with a visual point on the chart, the GUI may provide additional information including information from a different domain. The additional information may help detect global outliers which may be distinct from outliers with the same source of log data.

In an embodiment, the log analytic system is executed or otherwise integrated into a cloud service. One or more tenants may subscribe to the cloud service and link one or more sources of log data. The cloud service may then perform clustering and analytics of the subscribing entities log data as described further herein. In other embodiments, the log analytic system may be a standalone software application or part of a suite of software applications which may execute locally or remotely relative to a user of the application.

While several examples herein are described by way of illustration with respect to "log" data, the techniques are not limited in scope only to the analysis of log data and may be applied to a wide range of data types. The following description may interchangeably refer to the data being processed as "records" or "messages", without intent to limit the scope to any particular format of data.

One or more embodiments described in this Specification and/or recited in the claims may not be included in this General Overview section.

2.0 SYSTEM OVERVIEW

FIG. 1 illustrates an example system for analyzing and classifying sets of data according to an embodiment. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

System 100 includes components for interacting with one or more users. In an embodiment, users interact with log analytics system 104 via client applications, such as client application 102. Client application 102 may comprise software and/or hardware that may be used to operate or interface with log analytics system 104. Client application 102 may execute on one or more digital devices, examples of which include workstations, personal computers, mobile devices, and remote computing terminals. A digital device may comprise a display, such as a monitor or touchscreen, for displaying a user interface to users of client application 102. A digital device may also comprise one or more input devices that allows users to provide operational control over the activities of system 100, such as a mouse or keyboard to manipulate a pointing object in a graphical user interface (GUI) to generate user inputs.

Log analytics system 104 comprises functionality that is accessible to users of client application 102. Log analytics system 104 may be implemented as or include a set of engines or modules to perform clustering and/or analytics. In an embodiment, log analytics system 104 includes client interface 106, clustering engine 108, and analytics engine 110. Clustering engine 108 may perform classification operations to cluster/group raw log data 114. Analytics engine 110 may be used to analyze the grouped log data and trigger automated actions. Examples of such analytics include anomaly detection, diagnostics, sequence analysis, and forecasting.

Client interface 106 is configured to facilitate communication with users via client application 102. In an embodiment, client interface 106 renders user interface elements and receives input via user interface elements. Example interfaces include a GUI, a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, data repository 112 stores raw log data 114 and processed log data 116. Data repository 112 may be any type of storage unit and/or device (e.g., a file system, database, collection of tables, or any other storage mechanism) for storing data. Further, data repository 112 may include multiple different storage units and/or devices. The multiple different storage units and/or devices may or may not be of the same type or located at the same physical site. Further, data repository 112 may be implemented or may execute on the same computing system as one or more other components of system 100. Alternatively or additionally, data repository 112 may be implemented or executed on a computing system separate from one or more components of system 100. Data repository 112 may be communicatively coupled to log analytics system 104 via a direct connection or via a network.

In an embodiment, raw log data 114 is processed by log analytics system 104 to generate processed log data 116. Raw log data 114 may originate from any log-producing source location, such as log source 118a and log source 118b. For example, raw log data 114 may originate from a database management system (DBMS), database application (DB App), middleware application, web server, or any other log-producing application or system.

Log analytics system 104 may receive instructions or requests from one or more client applications, including client application 102. For example, log analytics system 104 may receive a request from client application 102 to cluster and analyze raw log data 114 within data repository 112. In response, clustering engine 108 may generate a set of clusters, and analytics engine 110 may analyze the data to generate an analytic output. The analytic output may provide insights into the data that are determined through machine-learning, NLP, and/or other analytic techniques. Additionally or alternatively, log analytics system 104 may trigger one or more automated actions responsive to a request received from client application 102, such as remedying outliers among the set of generated clusters.

In an embodiment, log analytics system 104 is implemented as a cloud service or microservice application. Additional embodiments and examples relating to cloud services are described below in Section 6.0, titled "Computer Networks and Cloud Networks." Additional embodiments and examples relating to microservice applications are described below in Section 7.0, titled "Microservice Applications."

3.0 MULTI-DIMENSIONAL CLUSTERING AND ANALYTICS

3.1 Multiphase Clustering Process Overview

In an embodiment, clustering engine 108 clusters log record in multiple phases including an initial phase and one or more subsequent phases. The initial phase may generate an initial grouping of log records based on one or more dimensions, which may be selected by a user or automatically selected. The resulting cluster sets may then be fed as input into a "presentation" or "analytic" phase, which clusters across one or more additional dimensions to optimize the display characteristics of charts generated to visualize the clusters and to enhance analytic insights into the initial set of clusters.

Figure 2:
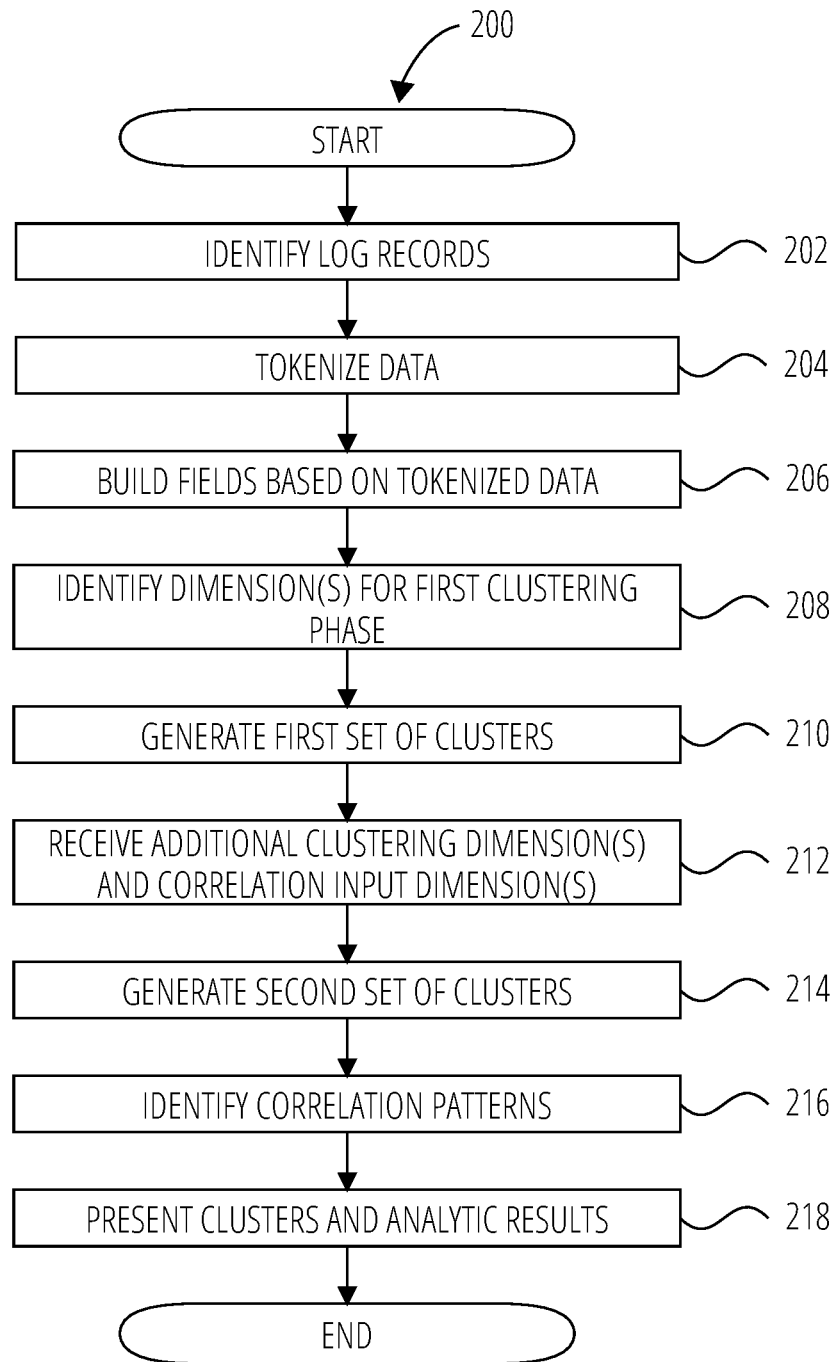
FIG. 2 illustrates an example process for clustering a set of log records according to an embodiment.

FIG. 2 illustrates example process 200 for clustering a set of log records according to an embodiment. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, process 200 identifies a set of log records (operation 202). The set of log records may originate from one or more log-producing source locations, such as log source 118a and log source 118b. Example log-producing source locations include a DBMS, a DB app, a middleware application, a web server, hardware logs, operating system logs, application logs, application server logs, database server logs, and any other type of log that monitors the behavior or a system or application. Additionally or alternatively, log records may track metrics and information related to an entity, such as flight log information, health logs for a human, and performance logs for a corporation.

In an embodiment, process 200 tokenizes the data within the log record (operation 204). Tokenization may include demarcating and classifying a string of input characters contained within a log record. Process 200 may use lexical analysis to extract keywords from a log record. For example, the log message "Server FOO is down" may extract four tokens as follows <record><keyword>Server</keyword><keyword>FOO</keyword><keyword>is</keyword><keyword>down</keyword></record>. The number and token values that are extracted may vary from one message to the next.

In an embodiment process 200 builds a set of fields based on the tokenized data (operation 206). Process 200 may apply one or more NLP and/or machine learning models to build the fields. For example, process 200 may apply a named entity recognition (NER) model to identify named entities, if any, that are within a log record. If parsing a flight log record, for instance, the NER model may be trained to extract the name of an airline from the flight log record, which may be added to a corresponding field. Another model may extract performance data from the log, such as flight delay times, flight capacity, flight duration, and/or other metric values. As another example, process 200 may apply a model to server log data to extract server response times, message size, active sessions, server hostname, internet protocol (IP) addresses, and/or other relevant attributes. Process 200 may then populate corresponding fields in a table or other data structure with the extracted data.

In an embodiment, process 200 identifies a first set of one or more cluster dimensions for a first clustering phase (operation 208). Process 200 may receive one or more cluster dimensions from a user, such as through the GUI of an application or a cloud service. Additionally or alternatively, process 200 may use a default set of cluster dimensions, select cluster dimensions according to predefined logic, or otherwise automatically select one or more cluster dimensions.

Responsive to identifying the one or more cluster dimensions, process 200 generates a first set of clusters (operation 210). In an embodiment, for the initial clustering phase, clustering engine 108 groups log records that share common values across the cluster dimensions. For example, clustering engine 108 may initially group log messages that share a source and destination IP address. Additionally or alternatively, log messages may be grouped along one or more other dimensions.

In an embodiment process 200 further receives one or more additional clustering dimensions and one or more correlation input dimensions (operation 212). System 100 may limit the additional clustering dimensions to fields that have a cardinality below a threshold and/or that have numeric attribute values. Nonnumeric fields with a high cardinality may lead to suboptimal visualizations with a high level of clutter or unintuitive groupings. Thus, fields with a cardinality above the threshold may be restricted to clustering in the initial cluster phase.

Responsive to receiving the additional clustering dimensions and one or more correlation inputs, process 200 generates second set of clusters based at least in part on variances in the first set of one or more dimensions in the log records (operation 214). In an embodiment, the specified clustering dimensions may include numeric or formula-based fields. For example, fields that track numeric data, such as response times, CPU utilization, memory throughput measurements, and/or other performance metrics may track numeric measurement values. With numeric data, process 200 may cluster groups of log records that have a small variation in values relative to other groups of records in the initial cluster set. Process 200 may use unsupervised machine learning model to partition data. Examples include a decision tree, k-means clustering, and support vector machines.

Process 200 further identifies one or more correlation patterns in the second set of clusters based on the one or more correlation input dimensions (operation 216). Process 200 may analyze the cardinality and frequency of the correlation input dimensions for each cluster in the second set of clusters. A low cardinality and/or high frequency of a dimensional attribute value indicates a strong likelihood that the dimension is strongly correlated with a cluster and the dimensions used to generate the cluster. Conversely, a high cardinality and relatively even distribution of different values indicates a strong likelihood that the dimension is not or weakly correlated with the cluster.

In an embodiment, process 200 presents the clusters and analytic results for the specified correlation inputs to a user (operation 218). The user may view and drill down on the analytic results for individual clusters to determine how strongly the specified fields or use cases correlate to the cluster. In some cases, a field may correlate strongly with an outlier but not with other clusters. For example, a cluster grouping log records that have anomalous response times may be highly correlated with a specific uniform resource locator (URL) whereas a non-anomalous cluster may not be correlated with any specific URL. Additionally or alternatively, different clusters may have varying degrees of correlation with a particular dimension. The analytic result of the correlation analysis may be leveraged to recommend and trigger downstream actions are described further below.

3.2 Custom Rule-Based Clustering

During a first phase of clustering, users may specify one or more dimensions for clustering engine 108 to use to generate the initial clusters. Clustering engine 108 accepts the one or more dimensions as input and returns a set of one or more clusters, where each cluster includes one or more log records that represent a unique combination of the dimensions. For example, if source IP address and destination IP address are specified as dimensions, then clustering engine 108 may execute a GROUP BY statement that groups records that have the same values for these dimensions. A summary may be returned for each group that identifies how many records are in the group, the unique combination of dimensional attributes the group represents, a start time identifying when the earliest log record in the group was generated, and an end time identifying when the most recent log record in the group was generated.

Figure 3A:
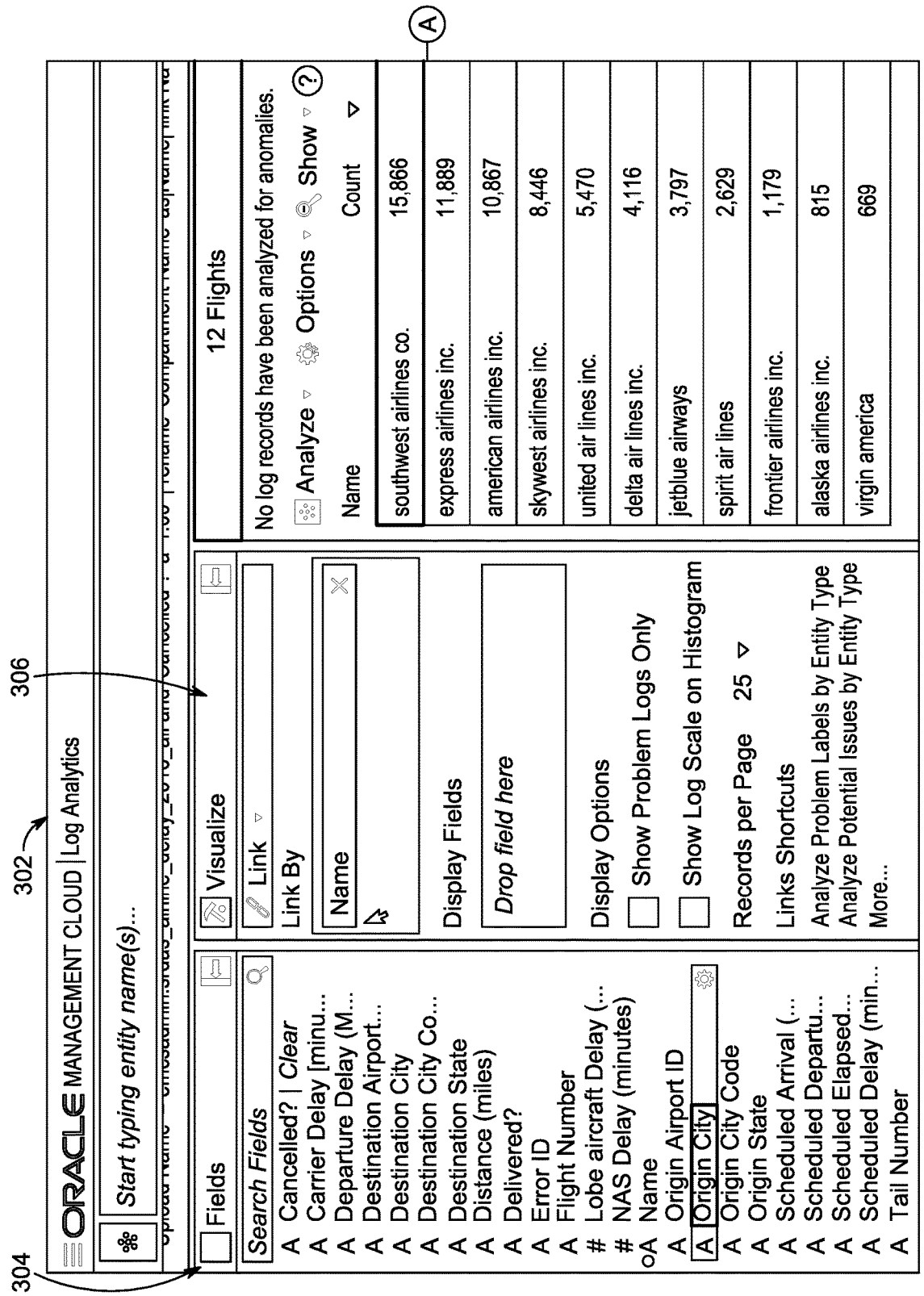
FIG. 3A illustrates an interactive interface for defining linking attributes to cluster log flight log records in accordance with an embodiment.

FIG. 3A illustrates an interactive interface for defining linking attributes to cluster log flight log records in accordance with an embodiment. Interface 302 includes fields pane 304 presenting selectable fields that may be used as link by dimensions for clustering. Visualize pane 306 shows the current fields that have been selected to cluster records. In the present example, a field storing airline names has been selected for clustering. In response, clustering engine 108 executes a GROUP BY on the Name field, which may be built and populated using NLP and machine learning as previously indicated. Result pane 308 illustrates the cluster results for the first phase. As shown, 65,900 flight records are grouped into 12 clusters with each cluster representing a different airline name. Result pane 308 shows the number of records, the start time, and the end time for the records in the cluster.

Figure 3B:
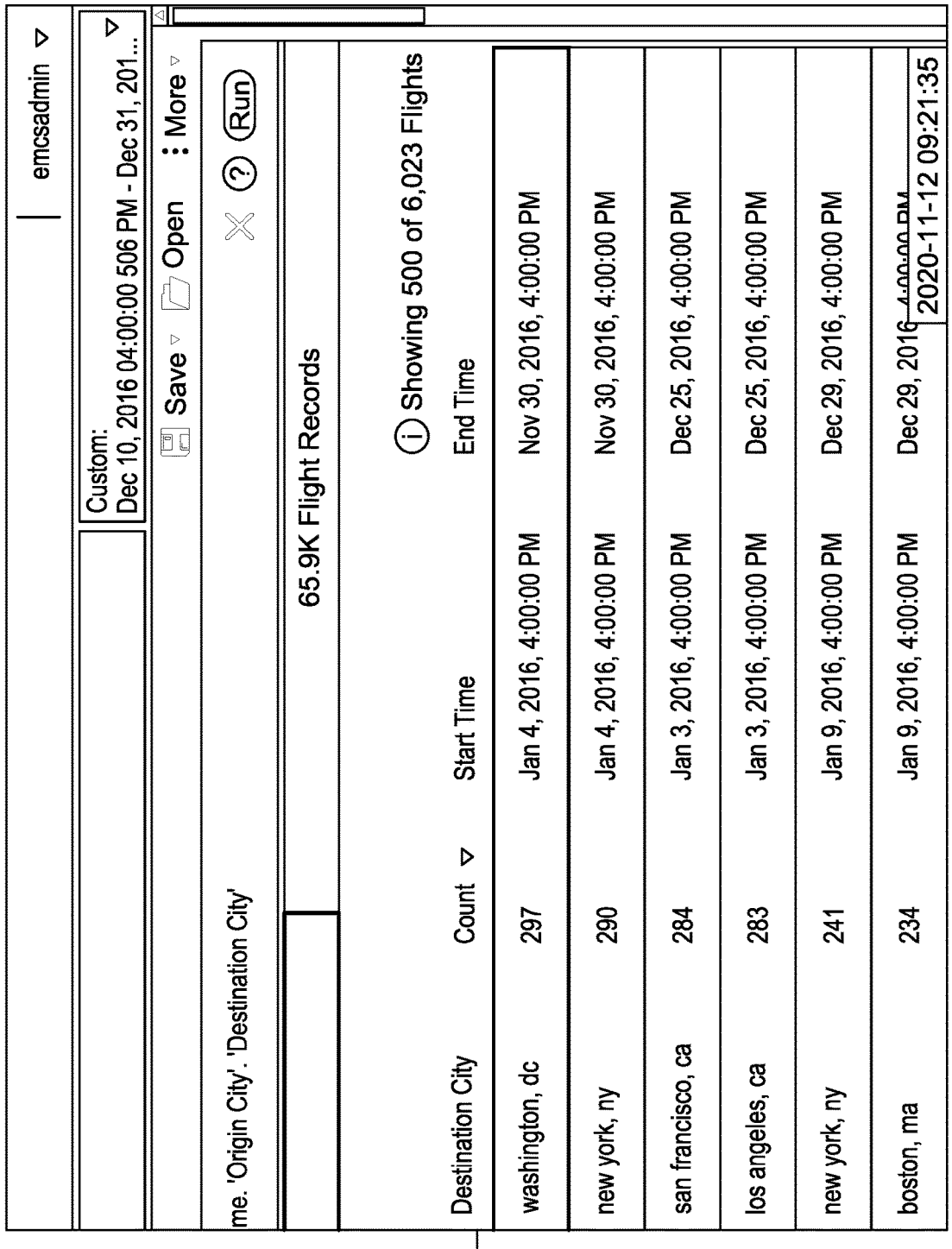
FIG. 3B illustrates an interactive interface with multiple dimensions defined to group flight log records in an initial clustering phase in accordance with an embodiment.

FIG. 3B illustrates an interactive interface with multiple dimensions defined to group flight log records in an initial clustering phase in accordance with an embodiment. Interface 310 depicts the results of a user adding additional dimensions through visualize pane 306 including the Origin City field and the Destination City field. Result pane 308 is updated to reflect the change in clusters. The 12 clusters shown in the previous example are transformed into 6,023 clusters, with each cluster representing a unique combination of name, origin city, and destination city attributes.

The "Link By" section of visualize pane 308 allows a user to quickly create and execute custom clustering rules to group log records. When the user inputs one or more dimensions, system 100 generates a query, which may be presented to the user. Referring to FIG. 3B, for instance, query 312 depicts an example query that may be formed to execute a rollup and group by operation on a set of log records based on the specified fields. The user may select "Run" to execute the query and group the clusters. When the query is executed, system 100 may store a cluster identifier that uniquely identifies each cluster, summary data that summarizes the cluster, cluster membership information that identifies which log records belong to the cluster, and cluster metadata providing information about the cluster such as when it was created.

Result pane 308 allows a user to run analytics on the log record clusters including detecting anomalies. In the illustrated example, result pane 308 indicates that no log records have been analyzed for anomalies. A user may select the Analyze drop down menu from result pane 308 to select/run analytics, including automatic outlier and anomaly detection, on the custom-defined log groupings. The analytics that are run may include running a second phase of clustering to provide additional insights as described further herein.

The examples depicted in FIG. 3A and FIG. 3B operated on flight log records. However, system 100 may process other types and sources of log data. The fields that are available to use as dimensions through the interface may vary depending on the fields that are built by the NLP and machine learning processes from the underlying log data. For example, fields such as Origin City and Destination City might not be available fields when the system processes server log records. Other fields may instead be built and populated based on keywords, patterns, rules, formulas, and/or other features that differentiate the server log records from the flight log records.

Figure 4:
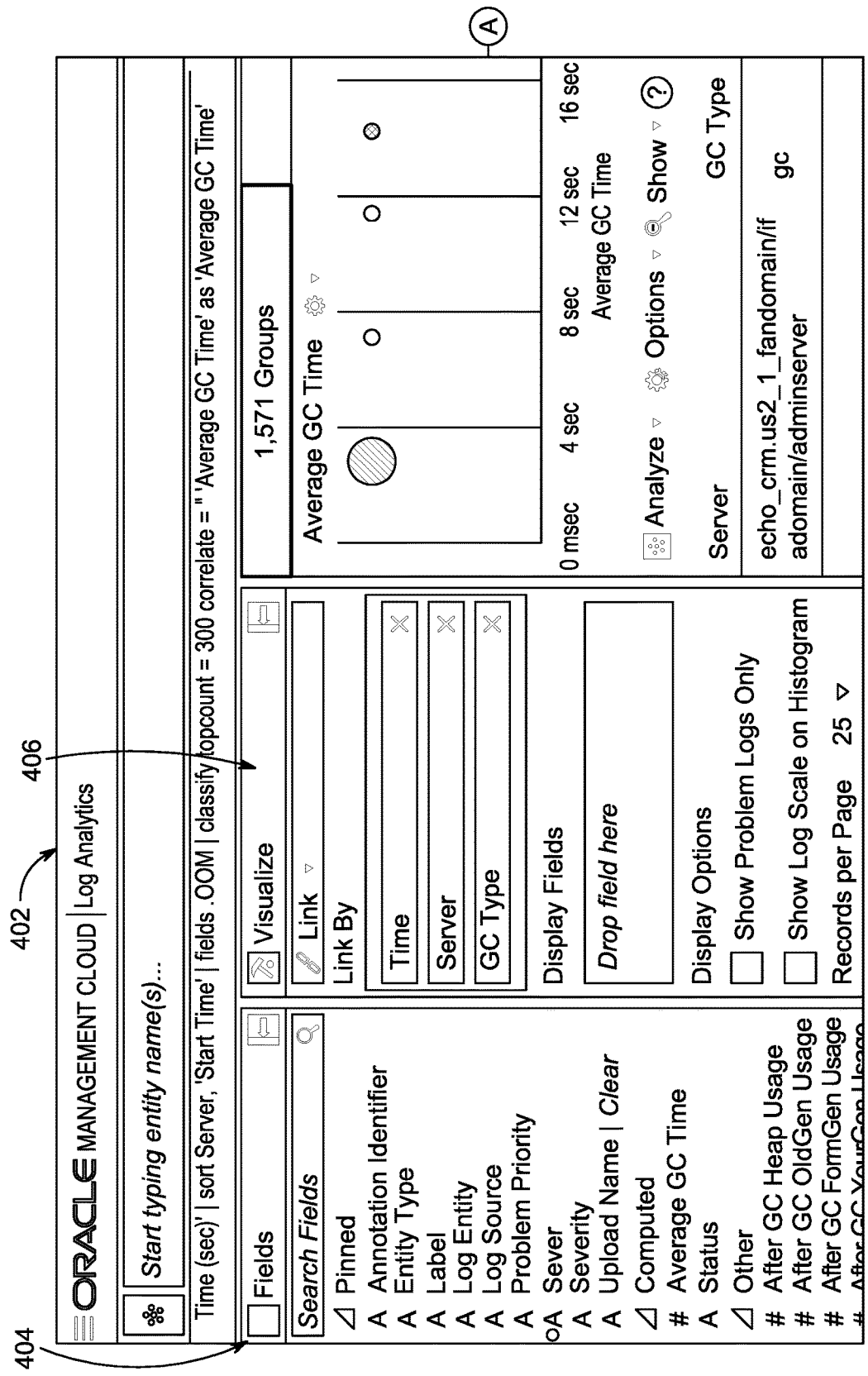
FIG. 4 illustrates an interactive interface with multiple dimensions defined to group server log records in an initial clustering phase in accordance with an embodiment.
Figure 4:
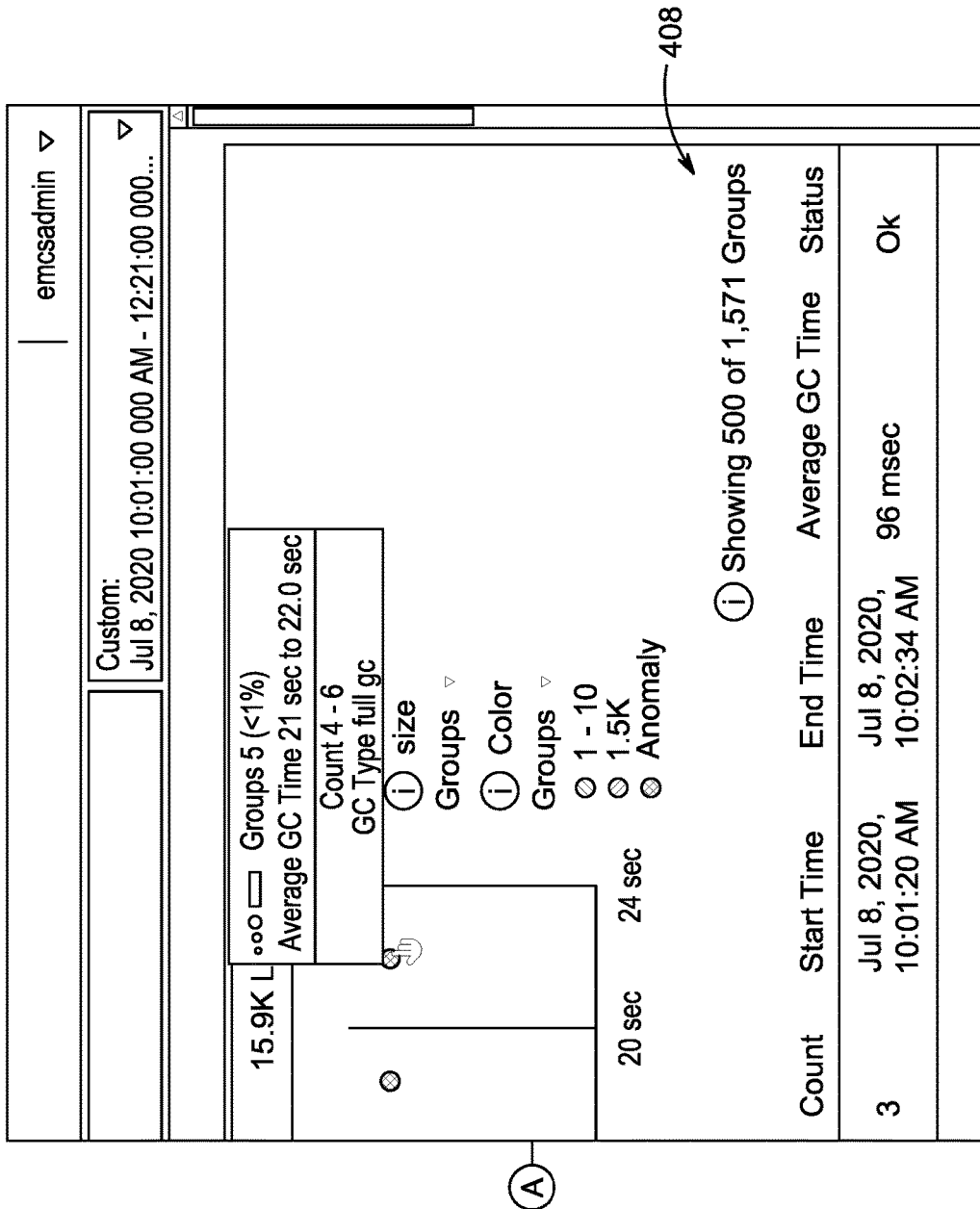

FIG. 4 illustrates an interactive interface with multiple dimensions defined to group server log records in an initial clustering phase in accordance with an embodiment. Referring to FIG. 4, interface 402 includes fields pane 404, which depicts available fields extracted from the server log data. As can be seen, the fields that are built in this case are different than the fields built from the flight log records. Visualize pane 406 shows that a user has selected the Time field, Server field, and GC Type field to use as cluster dimensions. The results are shown in result pane 408, which also include analytic results depicting average garbage collection (GC) time ranges for different clusters of log records.

3.3 Analytic and Presentation Tier Clustering

In an embodiment, clustering engine 108 performs additional clustering on the initial set of clusters to perform analytics and optimize presentation through a GUI. During a second phase of clustering, clustering engine 108 may receive one or more dimensions on which to perform clustering on the initial grouping of log data. In response, clustering engine 108 clusters the initial set of clusters into another set of clusters based on the newly received dimensions.

As previously indicated, system 100 may exclude non-numeric dimensions, such as fields populated with string values, that have a high cardinality. Process 200 may analyze the cardinality by searching for how many unique string values are included for a particular field. If the number of values exceeds a threshold, then system 100 may exclude the field from being selected by a user or recommend against using the field. The threshold may be based on display attributes, such as screen resolution, the number of colors in a color palette, and the number of histogram bins that may be displayed on a chart. For instance, if the cardinality exceeds the number of colors used to differentiate different dimensional values in a chart or the number of histogram bins available for a given screen resolution, then it may be excluded. The GUI may be rendered such that excluded fields are not selectable by the user.

Numeric and formula-based dimensions may have a high cardinality. However, process 200 may generally group distinct numeric values in a more intuitive manner than string values. For example, a cluster may represent a range of numeric values, such as a range of response times or some other performance metric. Process 200 may identify ranges based on variances, minimum values, maximum values, averages, and/or some combination thereof when generating the clusters based on numeric dimensions. As previously mentioned, process 200 may partition data using one or more techniques, such as using decision trees, SVMs, or k-means clustering. The range may be identified based on the minimum value in a log record or the minimum centroid value for a log group to the maximum value in a log record or the maximum centroid value for a log group in the cluster.

In an embodiment, a user may initiate the second phase of clustering by selecting "Analyze" once the initial set of clusters has been formed. Responsive to receiving the request to analyze the clusters, the application or cloud service may present a GUI through which the user may input one or more graphical and analytic dimensions to use for the second set of clusters. System 100 may automatically detect which fields are available to use for the dimensions based on what fields have been build from the underlying log data and the cardinality of the fields. The GUI may make these fields available to select, such as via a drop-down menu or other user interface element.

Figure 5:
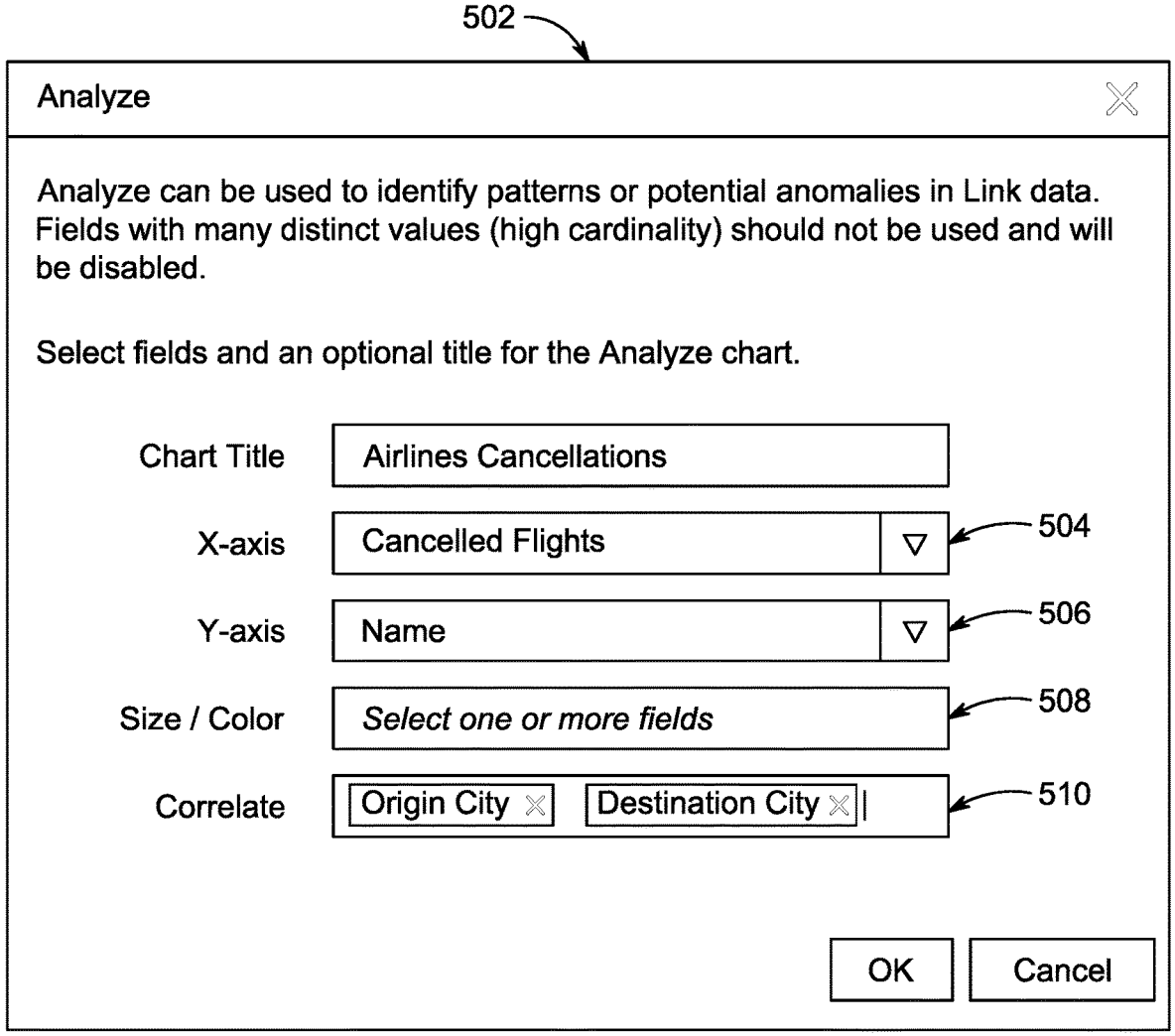
FIG. 5 illustrates an interactive interface for defining multiple dimensions and correlation inputs in accordance with an embodiment.

FIG. 5 illustrates an interactive interface for defining multiple dimensions and correlation inputs in accordance with an embodiment. Interface 502 provides an interface through which the user may specify graphical dimensions for an x-axis, a y-axis, a size, and a color. Interface 502 may present available fields to use a graphical dimension responsive to the user selecting drop-down menu 504 or drop-down menu 506. A size and/or color dimension may also be specified through input field 508. The available fields may vary depending on the results of the NLP processing of the log data. For example, the available fields extracted from flight log records may be different from server log records. Further, interface 502 may disable fields with a high cardinality that are nonnumeric.

Input field 510 allows users to specify correlation inputs. In the present example, the user has specified the fields Origin City and Destination City. The user has further selected Cancelled Flights as the x-axis dimension and Name as the y-axis dimension. The user has not specified a size or color dimension, and system 100 may automatically select default fields for these dimensions. Responsive to submitting the specified dimensions, system 100 may cluster the log groups and render a chart with the specified chart name.

Figure 6:
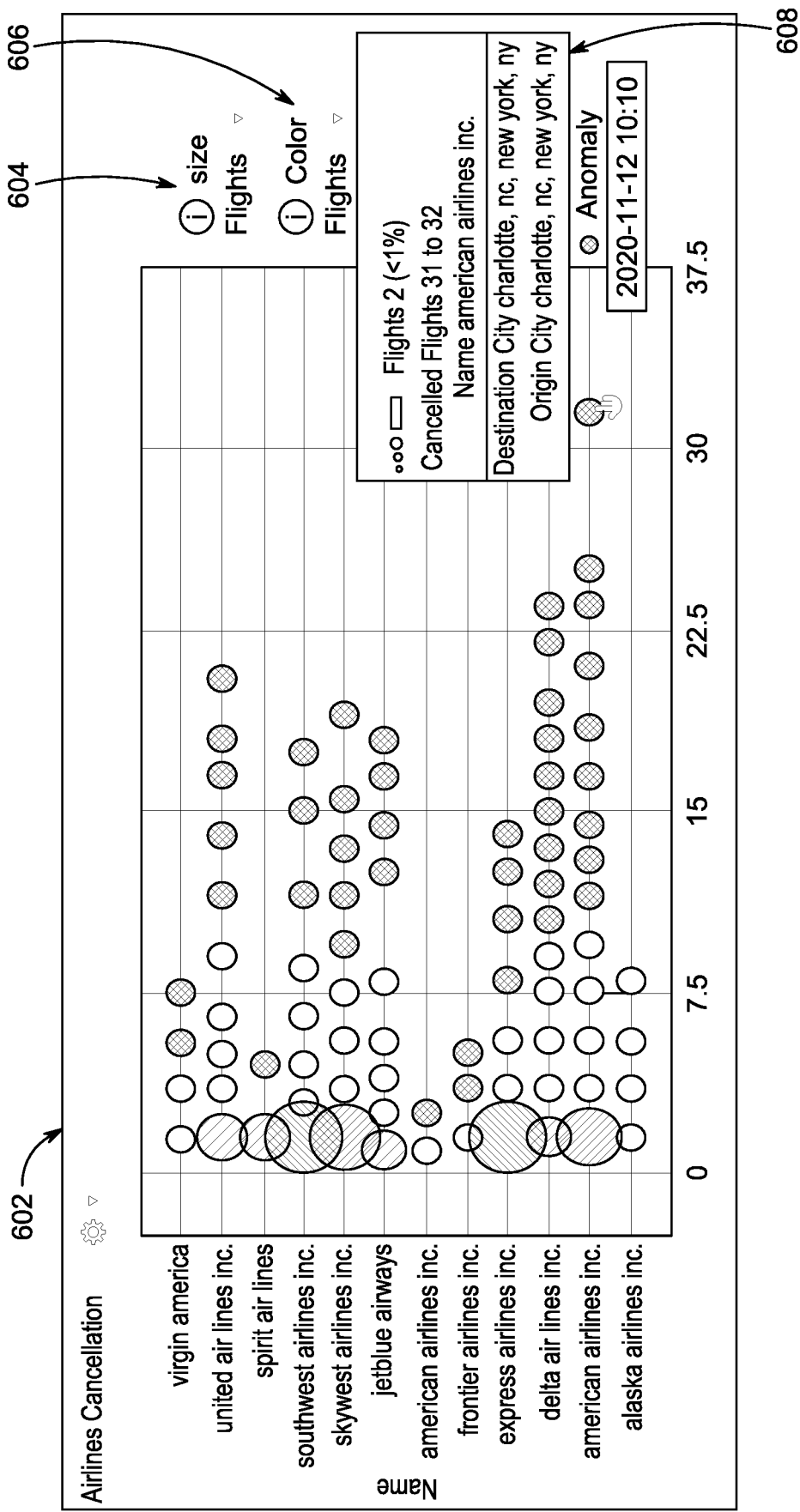
FIG. 6 illustrates an example chart that displays clusters groups of flight records based on user-specified parameters in accordance with an embodiment.

FIG. 6 illustrates an example chart that displays clusters groups of flight records based on user-specified parameters in accordance with an embodiment. Referring to FIG. 6, chart 602 may be displayed based on the dimensions submitted via interface 502. The y-axis 602 shows airline names and the x-axis corresponds to the number of flight cancellations. Each circle in the chart is a visual icon corresponding to a different cluster of log record groupings.

The size of a cluster visualization may be computed as a function of one or more dimensions. With respect to interface 602, the size of the cluster visualizations corresponds to the number of flights represented by each cluster. The user may select interface control 604 to change the field that the cluster size encodes. For example, the user may define the cluster to represent how many unique origin cities or destination cities the cluster represents or how many log records belong to the cluster. Larger clusters may represent a greater number of records, flights, cities and/or other values than smaller clusters.

The color of a cluster visualization may be selected as a function of one or more dimensions. For example, a color may encode one or more flight attribute values. A user may select user interface control 606 to change the field that a color represents. The size and color encodings of the cluster visualizations allow a user to quickly visually distinguish between cluster differences based on the different visual representations.

In an embodiment, system 100 visually distinguishes anomalous clusters from non-anomalous clusters. Outlier clusters may be identified based on the distribution of flight records within the clusters and distances between centroids of different clusters. Clusters with centroids that are far in Euclidean or cosine distance from the average centroid value may be classified as outliers. However, other outlier detection models may also be used to classify clusters depending on the particular implementation. If a cluster is classified as an outlier, then system 100 may render the corresponding cluster visualization in a distinct color unique to anomalous clusters or with a distinct visual pattern to allow the user to quickly notice anomalous patterns in the log data.

In an embodiment, when a user hovers over a cluster, analytic information for the cluster is presented through a graphic overlay, such as overlay 608. In the example depicted in FIG. 6, overlay 608 identifies the number of cancelled flights, the name of the airline, and values for the specified correlation inputs including the destination city and origin city for the cancelled flights. By presenting this data, the user may see that flights between Charlotte and New York for the specified airline have been canceled an anomalous number of times. Therefore, analytics may guide the user to isolate the root cause of cancellations and take appropriate remedial actions.

Figure 7:
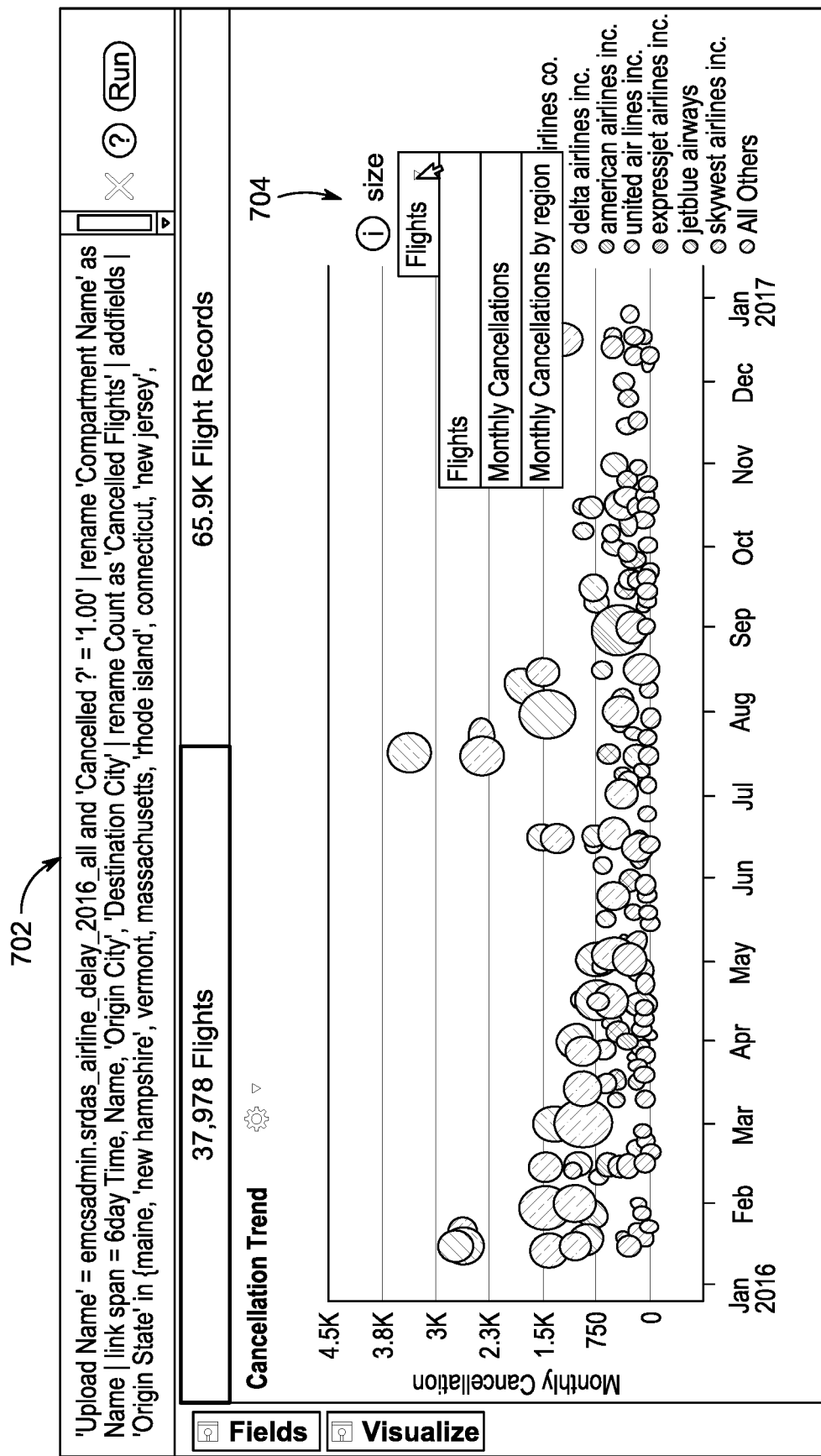
FIG. 7 illustrates another example chart that displays clusters groups of flight records based on user-specified parameters in accordance with an embodiment.

The user may change the dimension and/or correlation input values to perform further analytics on a set of grouped log data. For example, FIG. 7 illustrates another example chart that displays clusters groups of flight records based on user-specified parameters in accordance with an embodiment. Chart 702 shifts monthly cancellations to the y-axis and uses time for the x-axis, which gives a different view of the log clusters. User may select interface control 704 to toggle the size dimension between flights, monthly cancellations, and monthly cancellations by region. The color dimension in chart 702 encodes the name the airline, where different airlines are associated with different colors.

Figure 8:
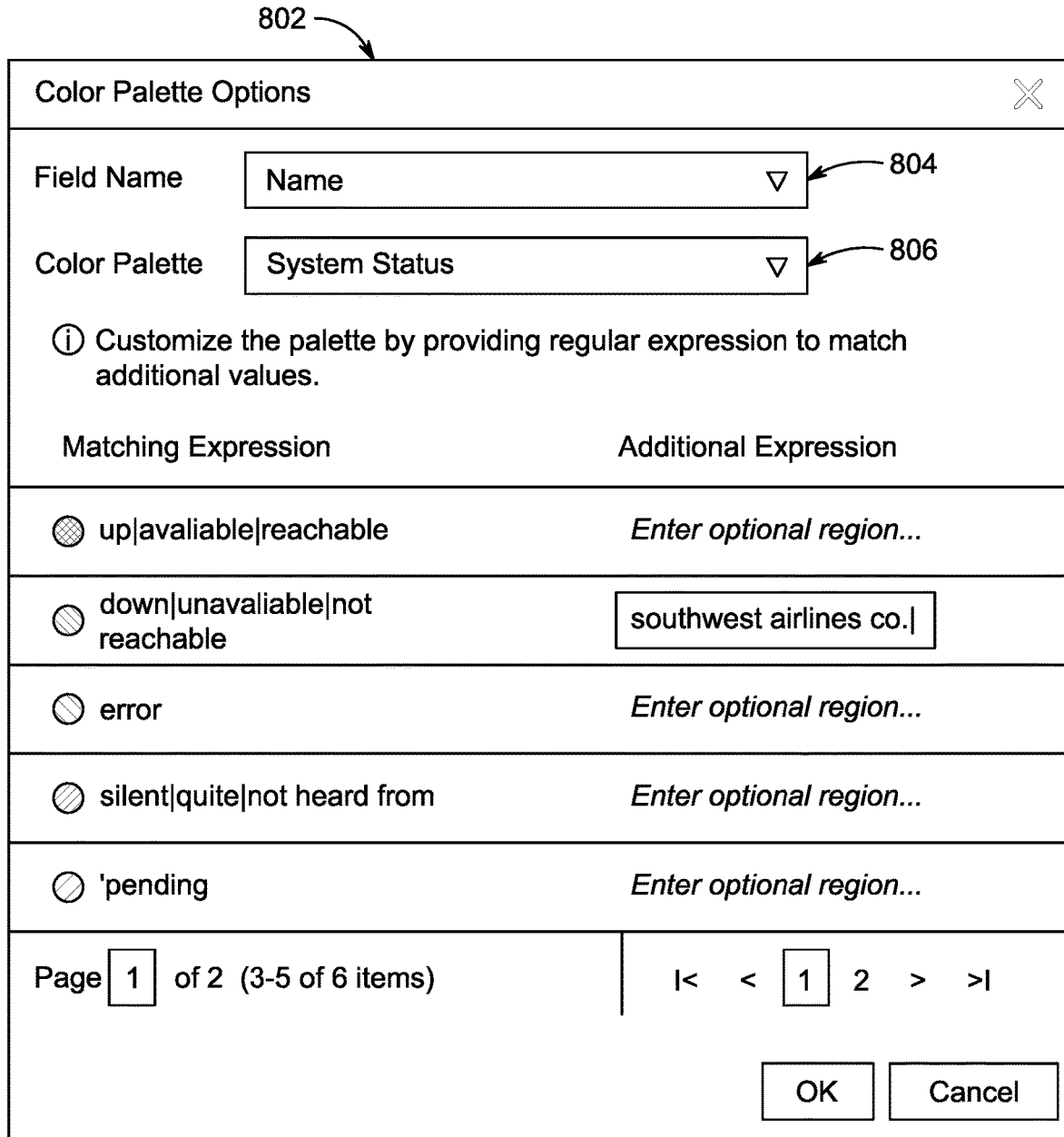
FIG. 8 illustrates an example interface for defining a color dimension in accordance with an embodiment.

FIG. 8 illustrates an example interface for defining a color dimension in accordance with an embodiment. Interface 802 provides drop-down menu 804 for selecting the field name for the color dimension and drop-down menu 806 allows the user to select the color palette. The user may customize the palette by defining regular expressions to match one or more values that map to a specified color.

4.0 CLUSTER-BASED DOWNSTREAM ACTIONS

Analytics engine 110 may be configured to perform various operations on clustered log data. In one embodiment, analytics engine 110 may be configured to generate summaries for one or more clusters based on the unique set of dimensional values and/or correlation results. The summary may comprise one or more sentences and/or sub-sentences that describe a behavior represented by the pattern. For example, a particular pattern of dimensional values may represent a high likelihood of a known problem in an application. A summary may be mapped to these values. If the clustering operations above produce a cluster representing the values, then the summary may be presented to the user to identify the problem.

In an embodiment, system 100 may display additional information, candidate tasks, or remedies based on the correlation inputs or independently based on outlier detection and root cause analysis. In one aspect, one or more actions may be mapped to combinations of dimensions and/or correlation analytic results. For example, a cluster logs representing the dimensional values server A and 1-2 second response times. Analytic engine 110 may determine that the response times for the server are an outlier relative to other servers. Using the hostname and/or IP address of the server, as extracted from the log records, analytic engine 110 may determine whether the server is up to date with recommended patches and/or system configurations. If not, analytic engine 110 may recommend applying a patch and/or system-level configuration. Additionally or alternatively, other actions may be identified based on the analytic results and dimensional attribute values for each cluster, such as migrating resources, shutting down a resource, tuning database queries, consolidating resources, and deploying additional resources.

In an embodiment, actions that are mapped to a particular dimensional analysis may be automatically recommended to an end user, such as a system administrator. System 100 may generate a link to present to the user based on which action has been selected for a particular cluster. The user may select the link, via a UI or API, to execute the recommended action, which may be a one-click process to remediate a performance issue associated with the outlier. System 100 may determine which resources are affected based on the log records in the cluster. For example, system 100 may identify a set of resources to patch based on which sources generated the log records or which resources are identified within the log records.

In an embodiment, users may configure actions to automatically trigger. For example, the user may configure system 100 to automatically apply patches to and/or redirect web traffic from servers that generate outlier log data. If the clustering operation produces a cluster representing a corresponding outlier, then the automated action may be triggered or presented to the user for further review, depending on the user specification. As previously indicated, outlier clusters may be determined based on (a) distance from other clusters and/or (b) the number of records in the cluster. In many instances, outlier clusters may be indicative that one or more resources have departed from expected behavior. Thus, the outlier clusters may be highlighted, along with summaries and recommended actions, to quickly isolate potential problems and bring them to the attention of a user.

In an embodiment, the clustering and analytic techniques described herein may be used to tune database queries. For example, a user may request to view a response time and indicate as a correlation input that the user is interested in analyzing a structured query language (SQL) statement. System 100 may then generate a chart that presents the user with a link to a SQL statement that caused an outlier of greater response time. The link may be presented when the user interacts with a point or graphical indication associated with the outlier. Alternatively or additionally, the system may present the user with a button to a sub-tool or exposed API for modifying the existing SQL command into a more efficient SQL command. Alternatively or additionally, the system may present the user with a button to a sub-tool or exposed API, such for seeing how long the SQL query was expected to have taken for comparison with how long the SQL query actually took. Alternatively or additionally, the proposed modification to the SQL statement may have an estimated time savings in comparison to the existing SQL query that was executed and resulted in the outlier. System 100 may present the estimated time savings to the user to guide the user's decision to tune or otherwise modify the SQL command.

The clustering techniques may further be applied to sources other than log data. For example, log analytics system 104 may ingest the text of Service Requests (SRs) or tickets filed by end users. The clustering process may then be applied to the SRs to group "similar" or "same" issues even though the text written by the users in the SRs may not be exactly identical. Thus, the clusters provide the ability to automatically identify similar issues and the unique varieties of issues filed by the users in a given time period.

In an embodiment, the clustering process may further be performed over multiple sources, and analytics engine 110 may find connections between the two sources for further analysis. For example, the clustering process may be applied to SRs and the log records pertinent to the environments mentioned in the SRs. Analytics engine 110 may then link the problems indicated in the SRs to corresponding environments. The clusters of log data associated with the environment may then be used to debug any underlying issues. Additionally or alternatively, analytics engine 110 may identify other environments where the same or similar issues exist but for which the end users have not yet filed SRs or tickets. Analytics engine 110 may then proactively trigger patches or other remedies to address the similar issues before the end user submits a service ticket.

5.0 MULTILAYERED INTERACTIVE INTERFACE

In an embodiment, an interactive interface is rendered as a function of one or more of the user-specified parameters as previously described including (a) one or more dimensions, and (b) one or more fields for pre-clustering. The interactive interface that is rendered as a function of the user-specified parameters may allow the user to drill down into different layers of varying granularity. For example, a user may specify two dimensions, response time and message size, and a correlation input identifying a URL attribute from a content server. In response, the system may automatically render an interface that presents clustered datasets related to the response time and/or message size. When the user interacts with a point representing a cluster, the interactive interface may further display information about the URL as pulled from a separate set of log files from a different domain, where a different system generated the separate set of log files. The URL information may be overlaid on the upper layer display or presented in a new screen. Additionally or alternatively, the user may drill-down to view candidate tasks or remedies the system recommends based on the correlation inputs or independently based on outlier detection/root cause analysis. The candidate tasks or remedies may include a button or link that, when selected, starts the user in a process (e.g., a one-click process) for remediating a performance issue associated with the outlier.

In an embodiment, the user may click on, hover over, or otherwise select a cluster to view another layer of the interface that presents more detailed aggregate information about the cluster. For example, the user may select or hover over a cluster to view the analytic results based on one or more correlation inputs. Additionally or alternatively, the user may drill down to other layers to view other aggregate cluster information such as to view if the system identified any attributes that were correlated with the unique combination of dimensions for a given cluster. Additionally or alternatively, the user may drill down to trigger automated downstream actions on all or a subset of targets in a cluster. For instance, the interactive interface may trigger the application of patches and/or other remedies for outliers among the clusters.

Figure 9A:
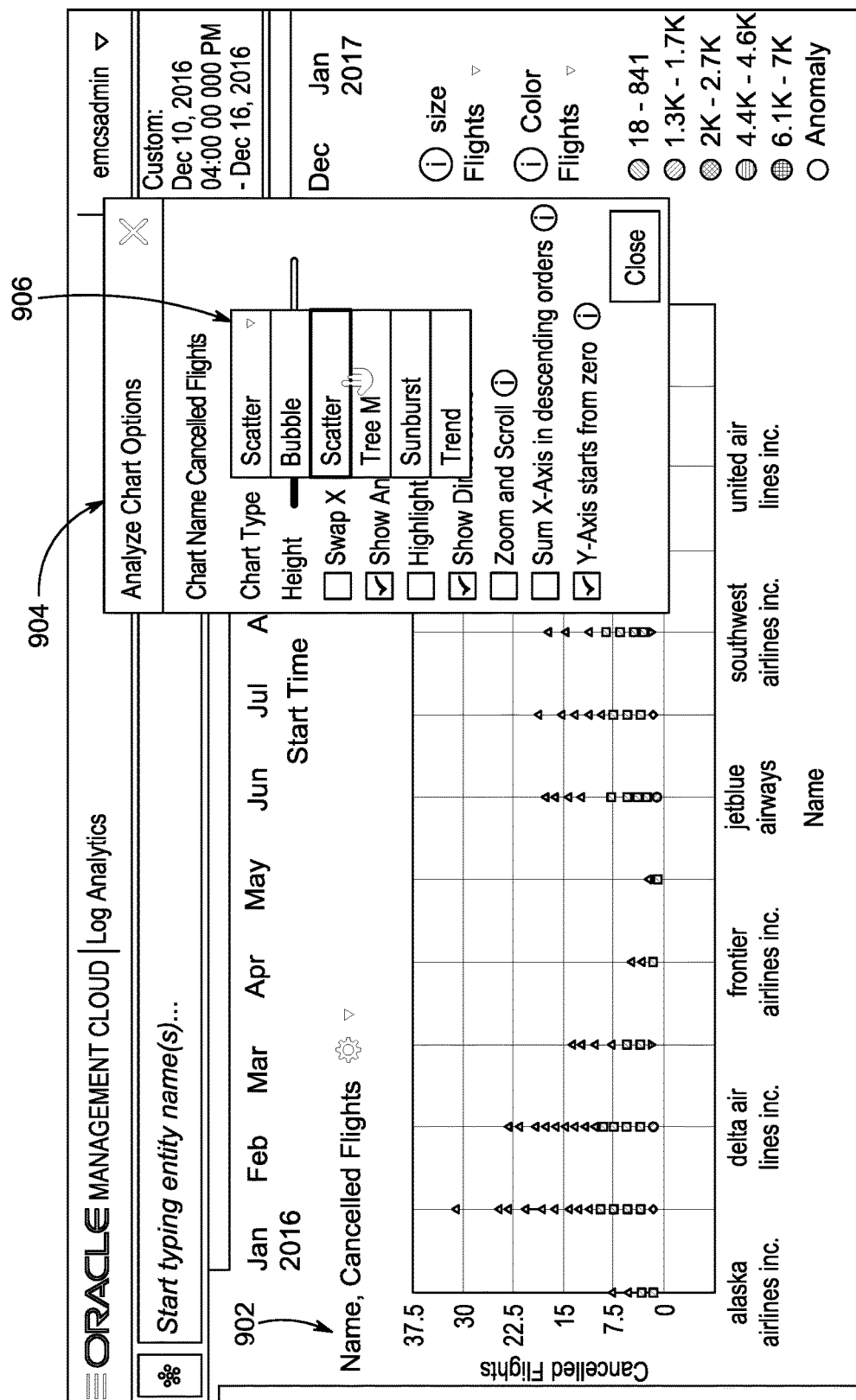
FIG. 9A illustrates a scatter plot of log records in accordance with an embodiment.

In an embodiment, the interactive interface may allow a user to toggle between different cluster visualization chart. Examples include a bubble chart, a scatter plot, a tree map, and a sunburst. For instance, FIG. 9A illustrates a scatter plot of log records in accordance with an embodiment. In the example shown, chart 902 is a scatter plot where the y-dimension represents cancelled flights, and the x-dimension represents the Airline Name field. Interface control 904 includes drop-down menu 906, which allows the user to switch between different chart types. Interface control 904 further allows the user to toggle between other attributes of chart 902, such as whether to display the dimension names, whether to sort the x-axis in descending order, and whether the y-axis starts from 0.

Figure 9B:
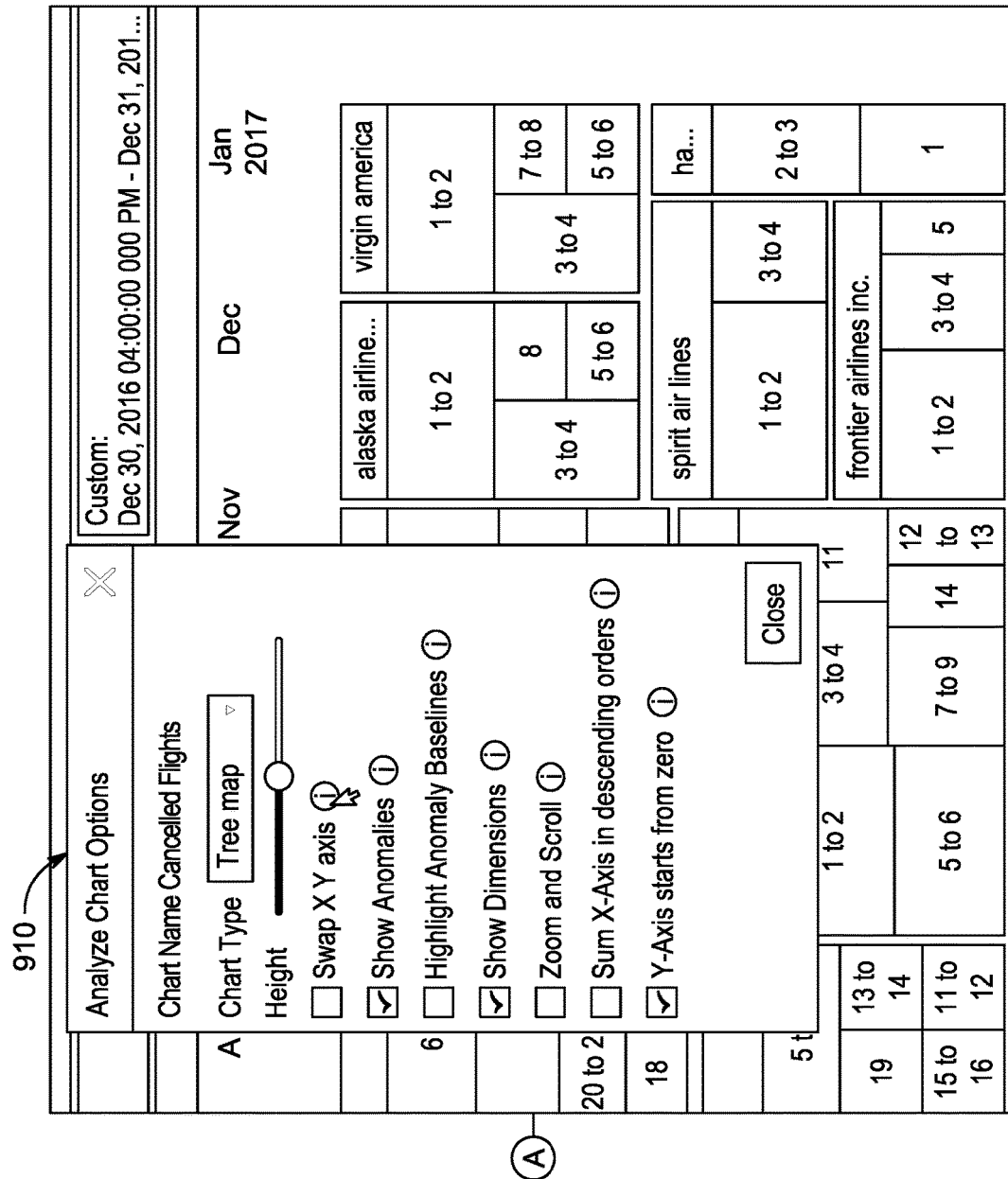
FIG. 9B illustrates a tree map of log records in accordance with an embodiment.

FIG. 9B illustrates a tree map of log records in accordance with an embodiment. In the example shown, chart 908 is a tree map where hierarchical log data is displayed as a set of nested rectangles including rectangles representing airlines and nested rectangles therein representing cancelled flights. The area of the rectangles may be proportional to the number of flights represented by the cluster visualization. Interface control 910 allows the user to swap the x and y axis, which changes how the rectangles are rendered and the height of the tree map.

Figure 9C:
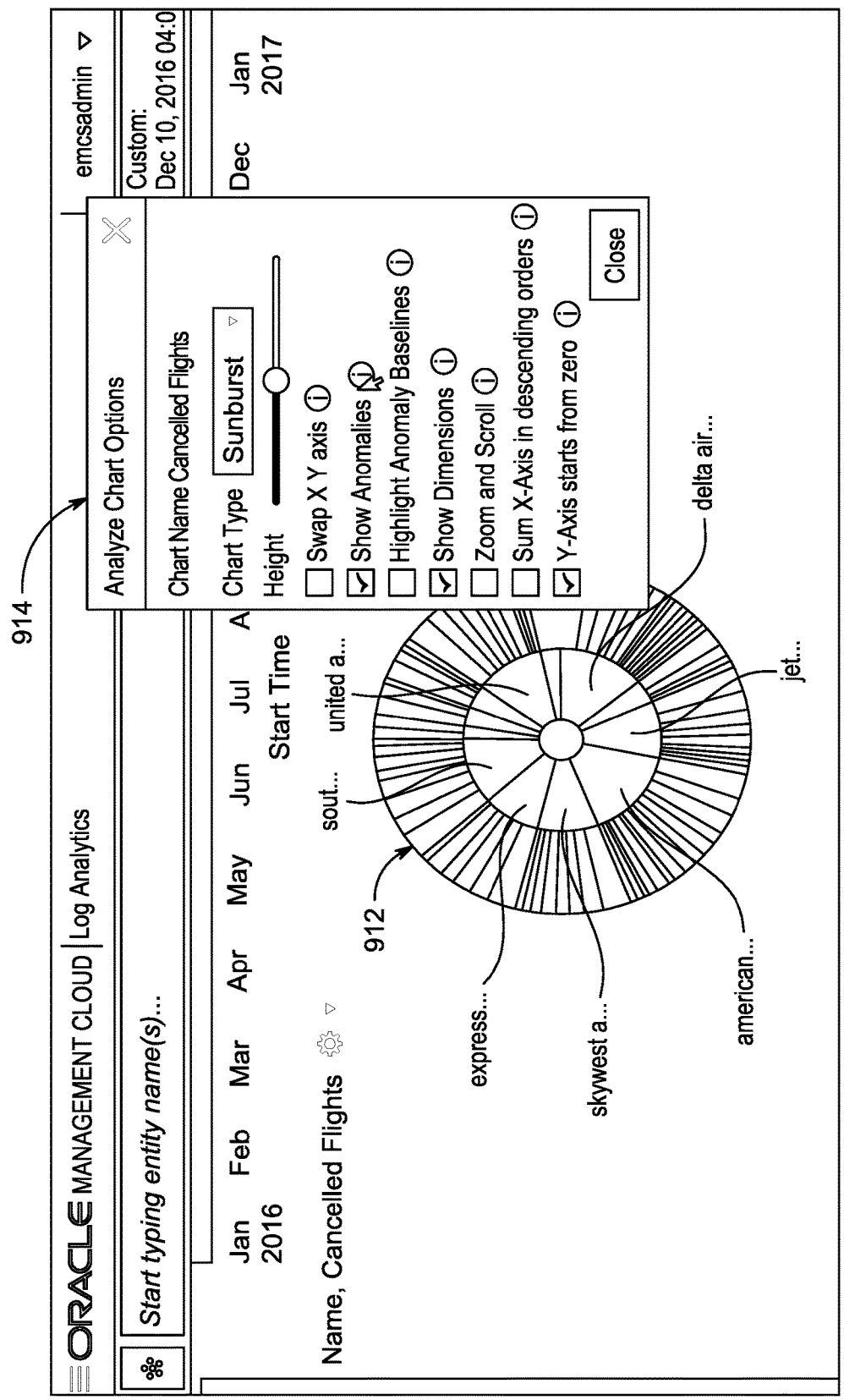
FIG. 9C illustrates a sunburst chart for a set of log records in accordance with an embodiment.

FIG. 9C illustrates a sunburst chart for a set of log records in accordance with an embodiment. In the example shown, chart 912 is a sunburst where the outside ring represents cancelled flights, and the inside ring represents the Airline Name field. Interface control 914 allows the user to swap dimensions as with the tree map.

Figure 10A:
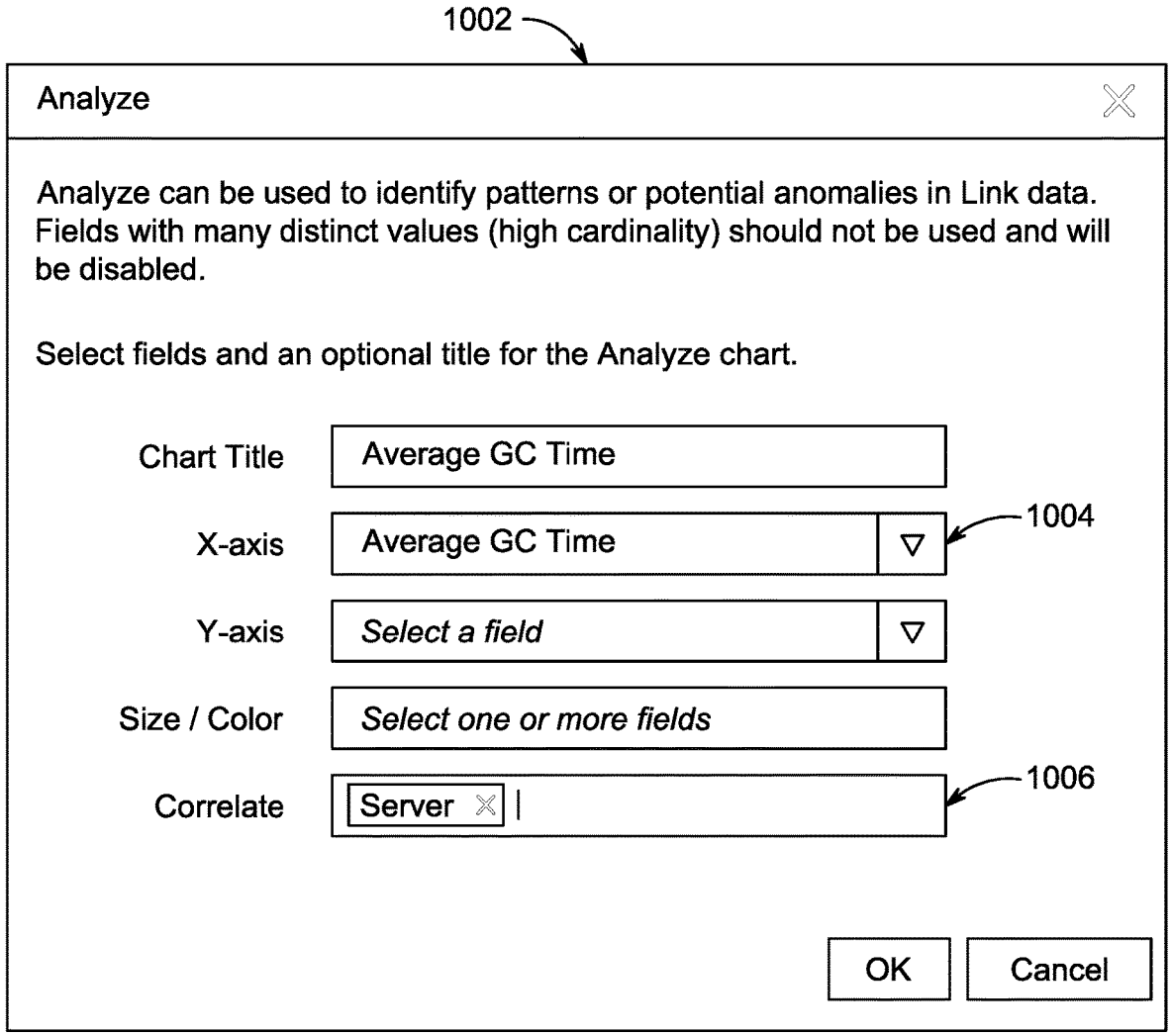
FIG. 10A illustrates an interactive interface for defining multiple dimensions and correlation inputs for groups of server logs in accordance with an embodiment.

The example interfaces above depicted various operations on flight log records. However, the clustering, analytics, and visualizations may be applied to other sets of log records. For example, FIG. 10A illustrates an interactive interface for defining multiple dimensions and correlation inputs for groups of server logs in accordance with an embodiment. When operating on server performance logs, the fields that are automatically detected by system 100 are different than for flight log processing. Thus, the dimensions that are made available through interface 1002 may vary depending on the underlying log data processed by the backend of system 100. In the present example, the user has selected the Average GC Time from drop-down menu 1004 and the Server field as a correlation input through input field 1006.

Figure 10B:
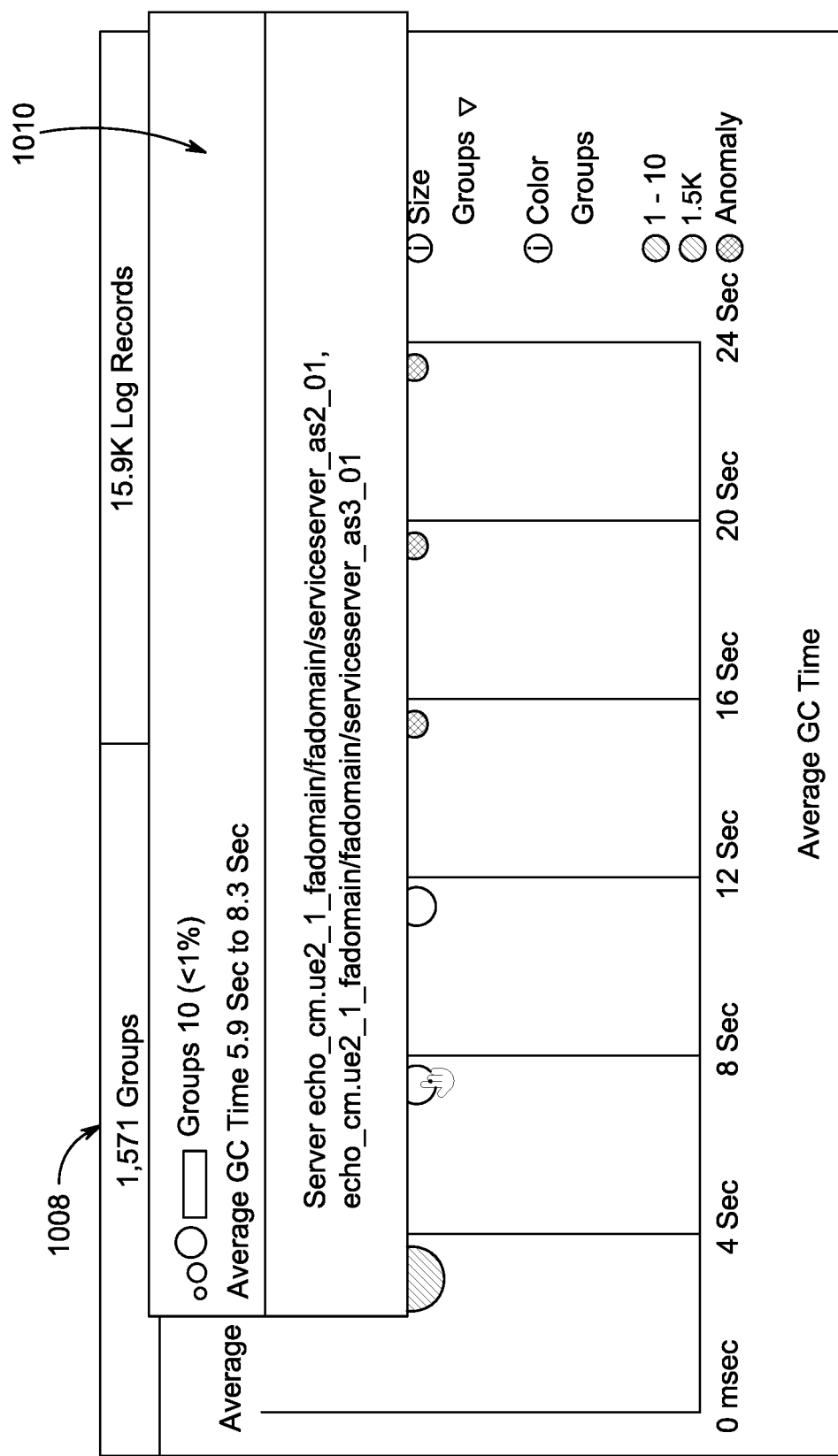
FIG. 10B illustrates an example bubble chart in accordance with an embodiment.

FIG. 10B illustrates an example bubble chart in accordance with an embodiment. Chart 1008 shows the average GC time on the x-axis as specified through interface control 1002. Upon hovering over a cluster bubble visualization, overlay 1010 is shown. The analytic data included in overlay 1010 includes the number of log groups in the cluster, the range of average GC times for the different groups, and the servers that generated the log data. For outlier clusters, a low cardinality in the server analytic data may indicate a strong correlation between the server and anomalous GC times. However, a high cardinality indicates that the root cause of slow GC times may not be the server. Therefore, the data may help isolate the root cause of performance degradation leading to slower than expected GC times and execute appropriate remedial actions.

6.0 COMPUTER NETWORKS AND CLOUD NETWORKS

In an embodiment, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7.0 MICROSERVICE APPLICATIONS

According to an embodiment, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In an embodiment, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to an embodiment. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In an embodiment, a plugged-in microservice application may expose actions to the microservices manager. The exposed actions may receive, as input, data or an identification of a data object or location of data, that causes data to be moved into a data cloud.

In an embodiment, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In an embodiment, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 11:
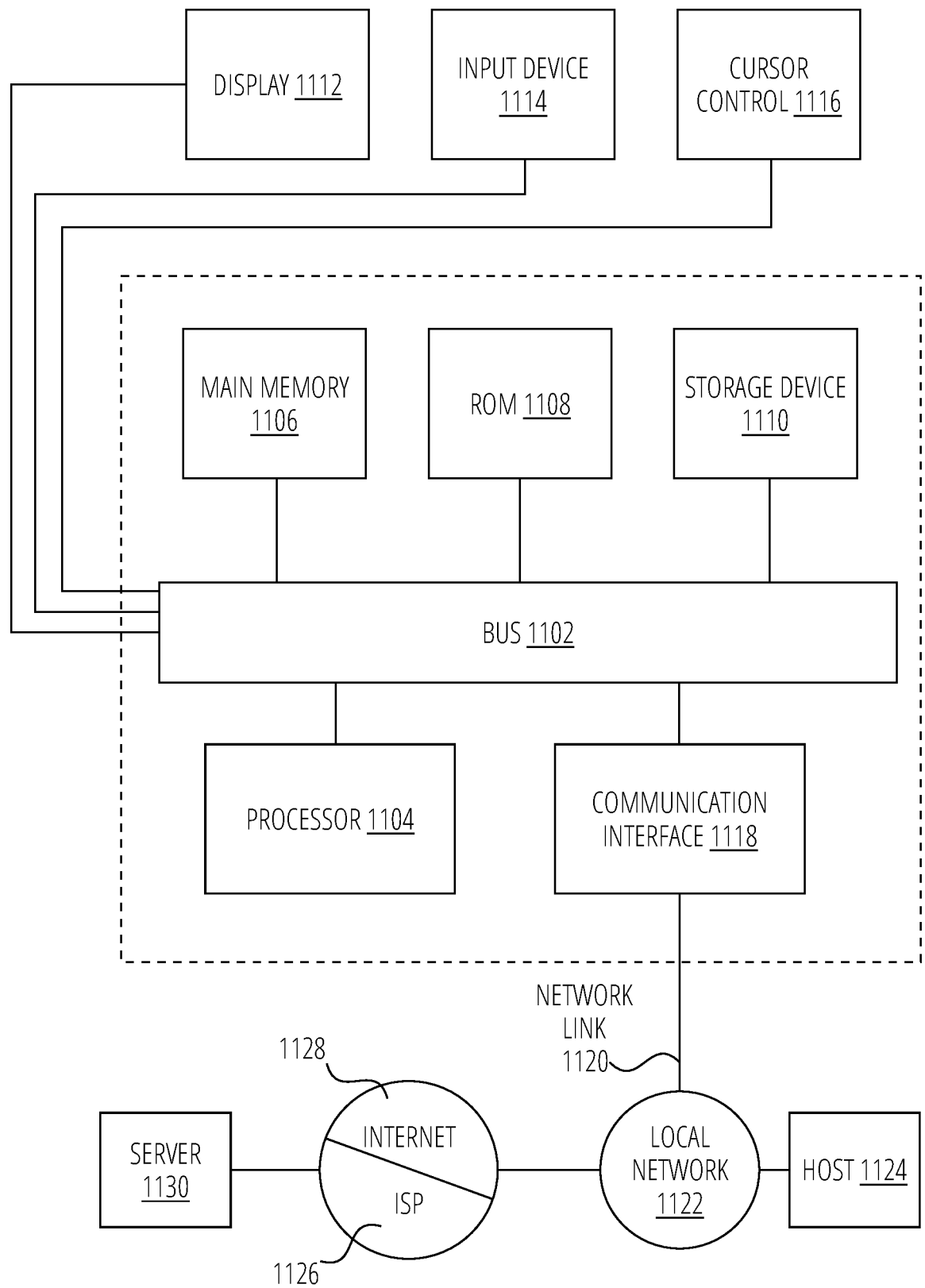
FIG. 11 shows a block diagram that illustrates a computer system in accordance with an embodiment.

For example, FIG. 11 is a block diagram that illustrates computer system 1100 upon which an embodiment of the invention may be implemented. Computer system 1100 includes bus 1102 or other communication mechanism for communicating information, and a hardware processor 1104 coupled with bus 1102 for processing information. Hardware processor 1104 may be, for example, a general purpose microprocessor.

Computer system 1100 also includes main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes read only memory (ROM) 1108 or other static storage device coupled to bus 1102 for storing static information and instructions for processor 1104. Storage device 1110, such as a magnetic disk or optical disk, is provided and coupled to bus 1102 for storing information and instructions.

Computer system 1100 may be coupled via bus 1102 to display 1112, such as a cathode ray tube (CRT) or light emitting diode (LED) monitor, for displaying information to a computer user. Input device 1114, which may include alphanumeric and other keys, is coupled to bus 1102 for communicating information and command selections to processor 1104. Another type of user input device is cursor control 1116, such as a mouse, a trackball, touchscreen, or cursor direction keys for communicating direction information and command selections to processor 1104 and for controlling cursor movement on display 1112. Input device 1114 typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 1100 can receive the data on the network line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

9.0 MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  receiving, by an application or cloud service executing on one or more computing devices, a request to cluster a set of records that identifies a first set of one or more dimensions to use for clustering and a second set of one or more dimensions to analyze for correlation patterns;
  responsive to receiving the request to cluster the set of records, generating, by the application or cloud service, a plurality of clusters based at least in part on variances in the first set of one or more dimensions, wherein each cluster includes at least one record from the set of records;
  generating, by the application or cloud service, a graphical user interface that includes a visualization indicating how strongly the second set of one or more dimensions correlate to at least one cluster of the plurality of clusters; and
  generating and presenting, by the application or cloud service, summary information for each cluster based at least in part on the second set of one or more dimensions.

2. The method of claim 1, wherein the at least one cluster is an outlier relative to other clusters in the plurality of clusters; wherein the visualization indicates how strongly the second set of one or more dimensions correlate with each outlier cluster among the plurality of clusters.

3. The method of claim 2, wherein outlier clusters among the plurality of clusters are identified by the application or cloud service based on at least one of a distance from the outlier cluster and other clusters in the plurality of clusters or how many records have been assigned to the outlier cluster.

4. The method of claim 1, wherein the graphical user interface presents at least one available action to execute to address anomalous behavior correlated with the second set of one or more dimensions.

5. The method of claim 1, wherein the request identifies a first dimension and a second dimension; wherein the visualization presents different clusters on a chart with a first axis representing different values of the first dimension and a second axis representing different values of the second dimension.

6. The method of claim 1, further comprising: generating a database query based on the request; presenting the database query to a user for review; and executing the database query against a database of log records to group the log records according to the first set of one or more dimensions.

7. The method of claim 1, wherein the visualization presents, for a particular cluster, a first set of information extracted from at least a first log record generated by a system in a first domain; the method further comprising: responsive to receiving input from a user interacting with a visual representation of the particular cluster, presenting a second set of information extracted from at least a second log record generated by a system in a second domain.

8. The method of claim 1, wherein presenting the at least one cluster comprises presenting at least one of a scatter plot or a heat map that highlights outlier clusters indicative of performance degradation.

9. The method of claim 1, wherein the visualization presents a first cluster in a first color based on a first value or range of values of a first dimension for records in the first cluster and a second cluster in a second color based on a second value or range of values for the first dimension for records in the second cluster.

10. A non-transitory computer-readable medium storing instructions which, when executed by one or more hardware processors, cause:
receiving, by an application or cloud service executing on one or more computing devices, a request to cluster a set of records that identifies a first set of one or more dimensions to use for clustering and a second set of one or more dimensions to analyze for correlation patterns;
responsive to receiving the request to cluster the set of records, generating, by the application or cloud service, a plurality of clusters based at least in part on variances in the first set of one or more dimensions, wherein each cluster includes at least one record from the set of records;
generating, by the application or cloud service, a graphical user interface that includes a visualization indicating how strongly the second set of one or more dimensions correlate to at least one cluster of the plurality of clusters; and
generating and presenting, by the application or cloud service, summary information for each cluster based at least in part on the second set of one or more dimensions.

11. The non-transitory computer-readable medium of claim 10, wherein the at least one cluster is an outlier relative to other clusters in the plurality of clusters; wherein the visualization indicates how strongly the second set of one or more dimensions correlate with each outlier cluster among the plurality of clusters.

12. The non-transitory computer-readable medium of claim 11, wherein outlier clusters among the plurality of clusters are identified by the application or cloud service based on at least one of a distance from the outlier cluster and other clusters in the plurality of clusters or how many records have been assigned to the outlier cluster.

13. The non-transitory computer-readable medium of claim 10, wherein the graphical user interface presents at least one available action to execute to address anomalous behavior correlated with the second set of one or more dimensions.

14. The non-transitory computer-readable medium of claim 1, wherein the request identifies a first dimension and a second dimension; wherein the visualization presents different clusters on a chart with a first axis representing different values of the first dimension and a second axis representing different values of the second dimension.

15. The non-transitory computer-readable medium of claim 10, wherein the instructions further cause: generating a database query based on the request; presenting the database query to a user for review; and executing the database query against a database of log records to group the log records according to the first set of one or more dimensions.

16. The non-transitory computer-readable medium of claim 10, wherein the visualization presents, for a particular cluster, a first set of information extracted from at least a first log record generated by a system in a first domain; wherein the instructions further cause: responsive to receiving input from a user interacting with a visual representation of the particular cluster, presenting a second set of information extracted from at least a second log record generated by a system in a second domain.

17. The non-transitory computer-readable medium of claim 1, wherein presenting the at least one cluster comprises presenting at least one of a scatter plot or a heat map that highlights outlier clusters indicative of performance degradation.

18. The non-transitory computer-readable medium of claim 10, wherein the visualization presents a first cluster in a first color based on a first value or range of values of a first dimension for records in the first cluster and a second cluster in a second color based on a second value or range of values for the first dimension for records in the second cluster.

19. A system comprising:
one or more hardware processors;
one or more non-transitory computer-readable media storing instructions, which when executed by one or more hardware processors, cause:
receiving, by an application or cloud service executing on one or more computing devices, a request to cluster a set of records that identifies a first set of one or more dimensions to use for clustering and a second set of one or more dimensions to analyze for correlation patterns;
responsive to receiving the request to cluster the set of records, generating, by the application or cloud service, a plurality of clusters based at least in part on variances in the first set of one or more dimensions, wherein each cluster includes at least one record from the set of records;
generating, by the application or cloud service, a graphical user interface that includes a visualization indicating how strongly the second set of one or more dimensions correlate to at least one cluster of the plurality of clusters; and
generating and presenting, by the application or cloud service, summary information for each cluster based at least in part on the second set of one or more dimensions.

20. The system of claim 19, wherein the at least one cluster is an outlier relative to other clusters in the plurality of clusters; wherein the visualization indicates how strongly the second set of one or more dimensions correlate with each outlier cluster among the plurality of clusters.

* * * * *

UNITED STATES PATENT AND TRADEMARK OFFICE
CERTIFICATE OF CORRECTION

PATENT NO. : 11,960,523 B2
APPLICATION NO. : 18/184187
DATED : April 16, 2024
INVENTOR(S) : Kumaresan et al.

It is certified that error appears in the above-identified patent and that said Letters Patent is hereby corrected as shown below:

In the Claims

In Column 24, Line 18, in Claim 17, delete "claim 1" and insert -- claim 10 --, therefor.

Signed and Sealed this
Fifteenth Day of October, 2024

Katherine Kelly Vidal
*Director of the United States Patent and Trademark Office*